United States Patent
Zhang

(10) Patent No.: US 11,289,072 B2
(45) Date of Patent: Mar. 29, 2022

(54) OBJECT RECOGNITION METHOD, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Mingyuan Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 126 days.

(21) Appl. No.: 16/663,086

(22) Filed: Oct. 24, 2019

(65) Prior Publication Data

US 2020/0058293 A1     Feb. 20, 2020

Related U.S. Application Data

(63) Continuation of application No. PCT/CN2018/103255, filed on Aug. 30, 2018.

(30) Foreign Application Priority Data

Oct. 23, 2017   (CN) .......................... 201710992605.7

(51) Int. Cl.
*G10L 17/00*     (2013.01)
*G06F 21/32*     (2013.01)
(Continued)

(52) U.S. Cl.
CPC ............ *G10L 15/063* (2013.01); *G06F 21/32* (2013.01); *G10L 15/02* (2013.01)

(58) Field of Classification Search
CPC .......... G10L 17/00; G10L 2021/02166; H04M 3/568; H04M 3/42221; H04M 3/567
See application file for complete search history.

(56) References Cited

U.S. PATENT DOCUMENTS 6,094,632 A * 7/2000 Hattori .................... G10L 17/24
                                                   379/88.01
6,751,590 B1 * 6/2004 Chaudhari .............. G10L 17/02
                                                   704/246
(Continued)

FOREIGN PATENT DOCUMENTS

CN      101782805 A     7/2010
CN      105280183 A     1/2016
(Continued)

OTHER PUBLICATIONS

The World Intellectual Property Organization (WIPO) International Search Report for PCT/CN2018/103255 dated Nov. 20, 2018 5 Pages (including translation).
(Continued)

*Primary Examiner* — Olujimi A Adesanya
(74) *Attorney, Agent, or Firm* — Anova Law Group, PLLC

(57) ABSTRACT

An object recognition method is provided. The method includes obtaining speech information of a target object in a current speech environment and position information of the target object; extracting voiceprint feature from the speech information based on a trained voiceprint matching model, to obtain voiceprint feature information; obtaining a voice confidence value corresponding to the voiceprint feature information; and obtaining an object recognition result of the target object based on the voice confidence value, the position information, and the voiceprint feature information.

14 Claims, 11 Drawing Sheets

(51) Int. Cl.
*G10L 15/06* (2013.01)
*G10L 15/02* (2006.01)

(56) References Cited

U.S. PATENT DOCUMENTS

| | | | |
|---|---|---|---|
| 10,178,301 B1* | 1/2019 | Welbourne | G06K 9/00892 |
| 10,255,922 B1* | 4/2019 | Sharifi | G10L 15/22 |
| 10,467,509 B2* | 11/2019 | Albadawi | G07C 9/28 |
| 2005/0086056 A1 | 4/2005 | Yoda et al. | |
| 2007/0219801 A1* | 9/2007 | Sundaram | G10L 17/04 |
| | | | 704/270 |
| 2010/0036792 A1 | 2/2010 | Sawada et al. | |
| 2010/0131273 A1* | 5/2010 | Aley-Raz | G10L 17/04 |
| | | | 704/247 |
| 2010/0185571 A1 | 7/2010 | Sawada | |
| 2011/0288866 A1 | 11/2011 | Rasmussen | |
| 2013/0162752 A1 | 6/2013 | Herz et al. | |
| 2013/0321133 A1* | 12/2013 | Michaelis | H04M 3/569 |
| | | | 340/10.42 |
| 2015/0302856 A1* | 10/2015 | Kim | G10L 25/48 |
| | | | 704/273 |
| 2015/0302869 A1 | 10/2015 | Tomlin et al. | |
| 2015/0371639 A1* | 12/2015 | Foerster | G10L 17/06 |
| | | | 704/233 |
| 2016/0125879 A1 | 5/2016 | Lovitt | |
| 2016/0307572 A1* | 10/2016 | Aviles-Casco | G10L 17/12 |
| 2016/0323274 A1* | 11/2016 | Chandrasekaran | G06F 21/32 |
| 2018/0018973 A1* | 1/2018 | Moreno | G10L 17/02 |
| 2018/0047394 A1* | 2/2018 | Tian | G10L 17/22 |
| 2018/0301151 A1* | 10/2018 | Mont-Reynaud | G10L 15/22 |
| 2019/0182176 A1* | 6/2019 | Niewczas | H04L 63/104 |

FOREIGN PATENT DOCUMENTS

| | | |
|---|---|---|
| CN | 106503513 A | 3/2017 |
| CN | 106961418 A | 7/2017 |
| CN | 107221331 A | 9/2017 |
| CN | 107862060 A | 3/2018 |
| CN | 108305615 A | 7/2018 |
| JP | 2005274707 A | 10/2005 |
| JP | 2009210956 A | 9/2009 |
| JP | 2010165305 A | 7/2010 |

OTHER PUBLICATIONS

The European Patent Office (EPO) The Extended European Search Report for 18870826.7 dated Nov. 26, 2020 7 Pages.
The Japan Patent Office (JPO) Notification of Reasons for Refusal for Application No. 2020-522805 and Translation dated Mar. 15, 2021 9 Pages.
Korean Intellectual Property Office (KIPO) Office Action 1 for 20197038790 dated May 27, 2021 12 Pages (including translation).

* cited by examiner

OBJECT RECOGNITION METHOD, COMPUTER DEVICE, AND COMPUTER-READABLE STORAGE MEDIUM

RELATED APPLICATIONS

This application claims priority to PCT Application No. PCT/CN2018/103255, which claims priority to Chinese Patent Application No. 201710992605.7, entitled "OBJECT RECOGNITION METHOD AND DEVICE, STORAGE MEDIUM, AND TERMINAL," filed with the China National Intellectual Property Administration on Oct. 23, 2017. The content of the two applications is incorporated by reference in its entirety.

FIELD OF THE TECHNOLOGY

This application relates to the field of computer technologies, and in particular, to an object recognition method, a computer device, and a computer-readable storage medium.

BACKGROUND OF THE DISCLOSURE

With continuous development of science and technologies, voiceprint recognition has been developed to be increasingly mature as a biometric recognition technology. A speaker may be identified from a plurality of speakers through the voiceprint recognition, or a speaker identity corresponding to a speech may be determined by recognizing voiceprint features of the speech. For example, a recording system in a speech recognition system may distinguish all speakers in a scenario by using voiceprints (for example, distinguish the judge and the prisoner in the scenario of a court trial by using the voiceprint recognition technology in the recording system).

Often, voiceprints are mainly recognized by matching voiceprint features (for example, an intonation, a dialect, a rhythm, and a nasal sound) of an acoustic model. However, when the similarity of the voiceprint features is relatively high, a situation in which differences of voiceprint matching results are relatively small, it is difficult to distinguish speakers according to the voiceprint matching results. This affects accuracy of the voiceprint recognition result.

SUMMARY

According to embodiments of this application, an object recognition method, a computer device, and a computer-readable storage medium are provided.

One aspect of the present disclosure provides an object recognition method. The method includes obtaining speech information of a target object in a current speech environment and position information of the target object; extracting voiceprint feature from the speech information based on a trained voiceprint matching model, to obtain voiceprint feature information; obtaining a voice confidence value corresponding to the voiceprint feature information; and obtaining an object recognition result of the target object based on the voice confidence value, the position information, and the voiceprint feature information.

Another aspect of the present disclosure provides a computer device. The computer device includes a processor and a memory, the memory stores a computer-readable instruction, and when executed by the processor, the computer-readable instruction causes the processor to perform the following steps: obtaining speech information of a target object in a current speech environment and position information of the target object; extracting voiceprint feature from the speech information based on a trained voiceprint matching model, to obtain voiceprint feature information; obtaining a voice confidence value corresponding to the voiceprint feature information; and obtaining an object recognition result of the target object based on the voice confidence value, the position information, and the voiceprint feature information.

Another aspect of the present disclosure provides a non-volatile computer-readable storage medium. The non-volatile computer-readable storage medium stores a computer-readable instruction, and when executed by one or more processors, the computer-readable instruction causes the one or more processors to perform the following steps: obtaining speech information of a target object in a current speech environment and position information of the target object; extracting voiceprint feature from the speech information based on a trained voiceprint matching model, to obtain voiceprint feature information; obtaining a voice confidence value corresponding to the voiceprint feature information; and obtaining an object recognition result of the target object based on the voice confidence value, the position information, and the voiceprint feature information.

The details of one or more embodiments of this application are disclosed in the following accompanying drawings and description. Other features, objectives, and advantages of this application become clearer from the specification, the accompanying drawings, and the claims.

BRIEF DESCRIPTION OF THE DRAWINGS

To describe the technical solutions in the embodiments of this application more clearly, the following briefly describes the accompanying drawings that need to be used in the embodiments. Apparently, the accompanying drawings in the following description show some embodiments of this application, and a person of ordinary skill in the art may derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

An object recognition method provided in the embodiments of this application may be applied to a scenario of performing voiceprint recognition on sound source objects in a multi-sound source environment, to identify target objects. For example, an object recognition device obtains speech information of a target object in a current speech environment and position information of the target object, then performs voiceprint feature extraction on the speech information based on a trained voiceprint matching model, and obtains voiceprint feature information corresponding to the speech information after the voiceprint feature extraction; and finally obtains a voice confidence value corresponding to the voiceprint feature information, and obtains an object recognition result of the target object based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result.

Figure 1:
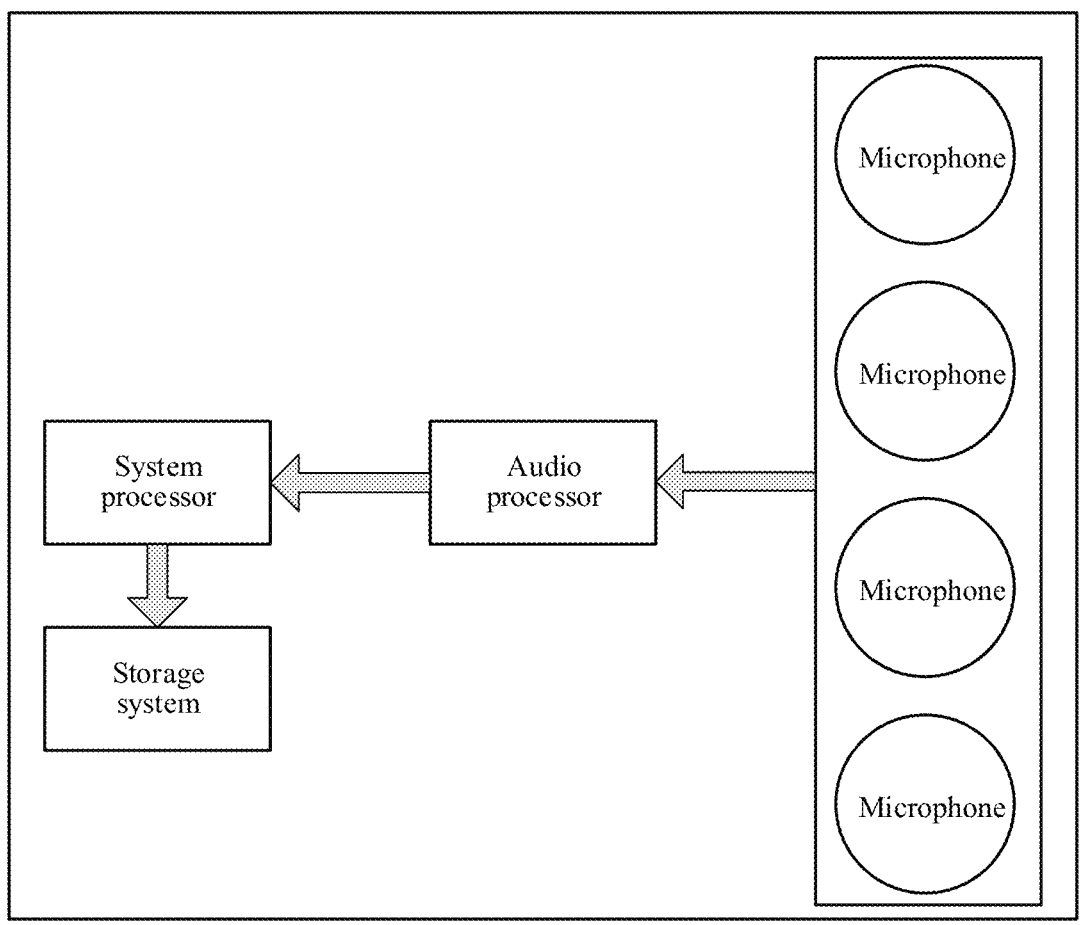
FIG. 1 is a schematic diagram of a hardware architecture of an object recognition device according to an embodiment of this application.
Figure 2:
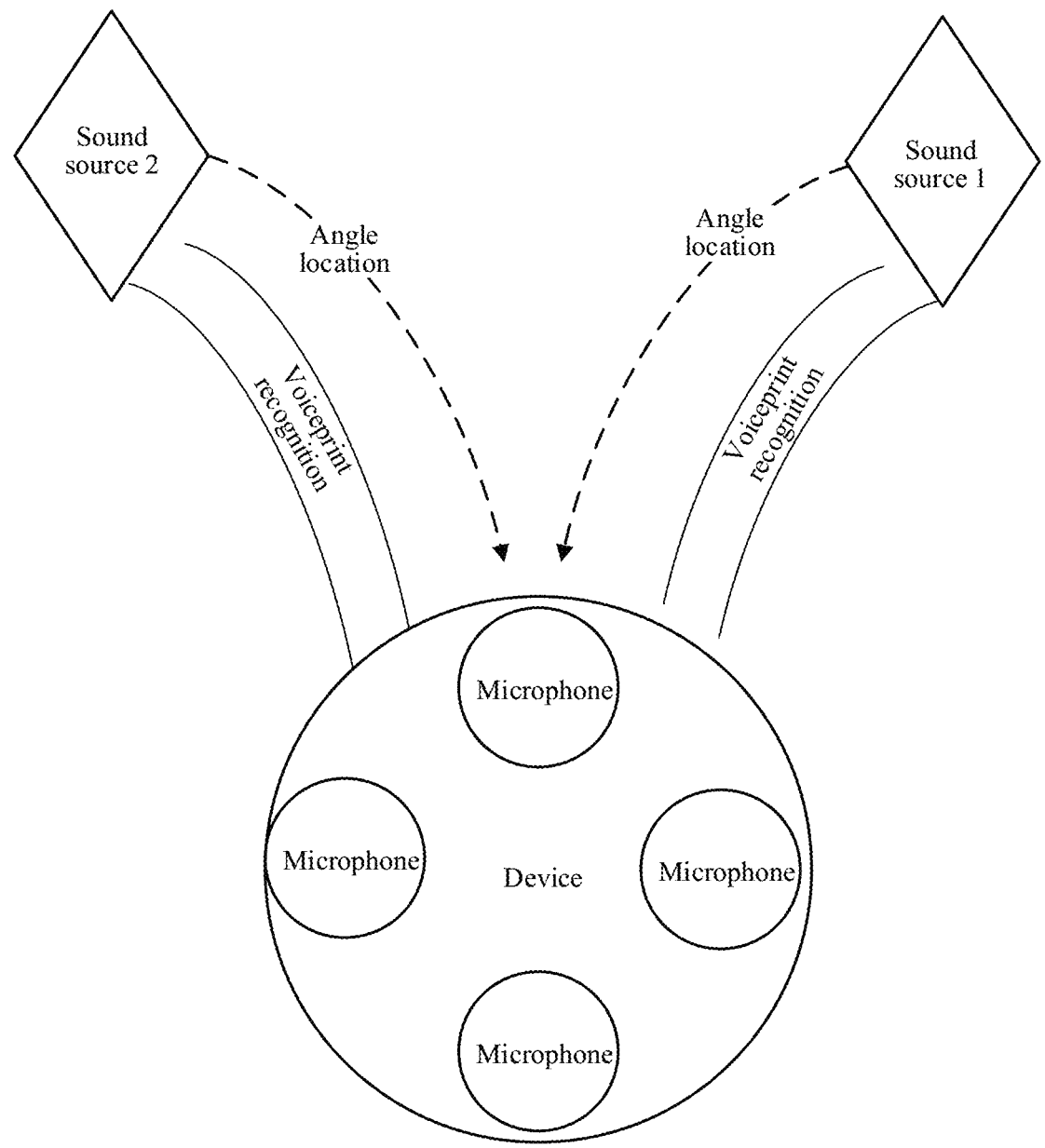
FIG. 2 is a system block diagram of an object recognition device according to an embodiment of this application.

The object recognition device in the embodiments of this application may be a tablet computer, a smartphone, a palmtop computer, a mobile Internet device (MID), and other terminal devices that may integrate a microphone array or may receive position information of a sound source transmitted by a microphone array and that have a voiceprint recognition function. A hardware architecture of the object recognition device is shown in FIG. 1. An audio processor is configured to reduce noise and locate directions, a system processor is configured to connect to the cloud and analyze voiceprint features, and a storage system is configured to store object recognition applications. A system block diagram of the object recognition device is shown in FIG. 2. A microphone array may recognize speech information corresponding to sound sources in different positions, and perform angle location on different sound sources.

The following describes the object recognition method provided in the embodiments of this application in detail with reference to FIG. 3 to FIG. 8.

Figure 3:
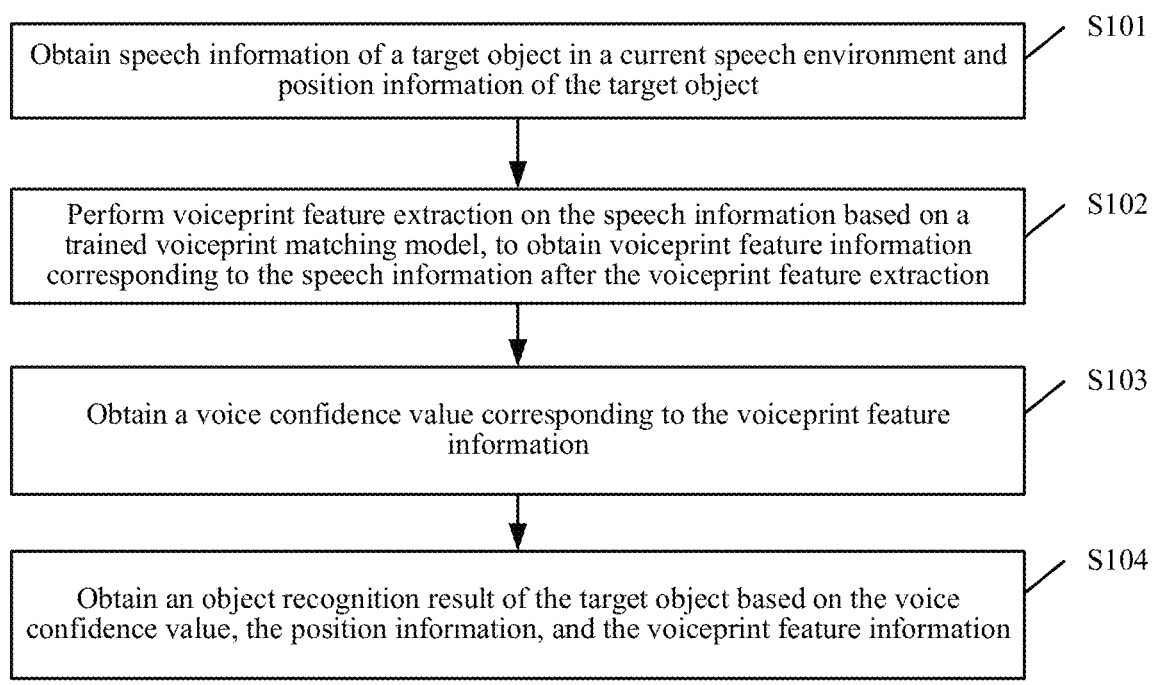
FIG. 3 is a schematic flowchart of an object recognition method according to an embodiment of this application.

FIG. 3 is a schematic flowchart of an object recognition method according to an embodiment of this application. As shown in FIG. 3, in an embodiment, the object recognition method may include the following step S101 to step S103.

S101. Obtain speech information of a target object in a current speech environment and position information of the target object.

Specifically, the object recognition device may obtain the speech information of the target object in the current speech environment based on a microphone array, and obtain the position information of the target object based on the microphone array.

In an embodiment, the target object may be a valid sound source object (for example, the judge, the lawyer, the defendant, or the plaintiff during a court trial case) in the current speech environment. The speech information in the speech information set obtained in the current speech environment by the object recognition device may be the speech information of the target object, or may be other unnecessary speech information (for example, speech information of the audience in the court during the court trial case or noise made by other objects). After obtaining the speech information set in the current speech environment, the object recognition device may perform screening processing on the speech information set, to obtain the speech information of the target object.

In an embodiment, the microphone array may obtain, by using a plurality of microphones, speech information of the same target object acquired from different positions. Because the plurality of microphones is located in different positions in the microphone array, each microphone may obtain phase information of the target object according to the volume of the sound, and calculate the position information of the target object (that is, determine position information of the target object in the current speech environment) in a beamforming manner according to the obtained phase information.

S102. Perform voiceprint feature extraction on the speech information based on a trained voiceprint matching model, to obtain voiceprint feature information corresponding to the speech information after the voiceprint feature extraction.

Specifically, the object recognition device may perform the voiceprint feature extraction on the speech information based on the trained voiceprint matching model.

In an embodiment, the voiceprint matching model may be a model established after voiceprint training speeches in a pre-acquired voiceprint training speech set and sample feature information corresponding to the voiceprint training speeches are trained by using a training algorithm (for example, a neural network method, a Hidden Markov method, or a VQ clustering method).

In an embodiment, a speech acquirer corresponding to speeches in a voiceprint training speech set may be a random experimental object, and is not limited to a specific target object. The sample feature information corresponding to the voiceprint training speeches may be voiceprint feature information of the voiceprint training speeches.

In an embodiment, the object recognition device may obtain the voiceprint feature information corresponding to the speech information after the voiceprint feature extraction. It may be understood that, the voiceprint feature information may be distinctive feature information in the speech information of the target object, for example, the feature information may be information such as an acoustic spectrum, harmonic peaks, a tone, a pitch, and a reflection ratio.

S103. Obtain a voice confidence value corresponding to the voiceprint feature information.

Specifically, the object recognition device may obtain the voice confidence value corresponding to the voiceprint feature information. It may be understood that, the voice confidence value may indicate the credibility of a correspondence between the voiceprint feature information and the target object. For example, when the voice confidence value is 90%, it may represent that the credibility of the target object recognized according to the voiceprint feature information corresponding to the voice confidence value is 90%.

In an embodiment, the object recognition device may match the voiceprint feature information with the sample feature information corresponding to the voiceprint training speeches, to obtain a matching degree value of a highest feature matching degree, and then determine the voice confidence value corresponding to the voiceprint feature information according to the matching degree value. For example, after the voiceprint feature information is matched with the sample feature information corresponding to the voiceprint training speeches in the voiceprint training speech set, if it is detected that a matching degree between sample feature information of voiceprint training speech A and the voiceprint feature information is the highest, and the highest value is 90%, the object recognition device may determine that the voice confidence value corresponding to the voiceprint feature information is 90%.

S104. Obtain an object recognition result of the target object based on the voice confidence value and by using the position information and the voiceprint feature information.

Specifically, the object recognition device may generate the object recognition result of the target object by using the voiceprint feature information, and the object recognition result may indicate a target object to which the speech information of the target object belongs. For example, if at least two target objects exist in the current speech environment, the object recognition device may classify speech information of the at least two target objects by using voiceprint feature information of the at least two target objects (for example, speeches of all target objects in a recording system during a court trial are classified into the judge, the defendant, the plaintiff, and the like).

In an embodiment, when two similar voiceprint features exist in the voiceprint feature information, a situation in which the object recognition device cannot accurately obtain the object recognition result of the target object by using the two similar voiceprint features may exist.

For the foregoing situation, the object recognition device may obtain the object recognition result of the target object based on the voice confidence value and by using the position information and the voiceprint feature information. Specifically, the object recognition device may determine, based on a relationship between the voice confidence value and a preset voice confidence value threshold, object recognition information used for recognizing the object recognition result of the target object, and then obtain the object recognition result according to the object recognition information. It may be understood that, the object recognition information may be the position information or the voiceprint feature information.

In an embodiment, the object recognition device may determine the voiceprint feature information as the object recognition information when the voice confidence value is greater than or equal to a first confidence threshold, and obtain the object recognition result of the target object according to the object recognition information (that is, identify the target object by using the voiceprint feature information, but the position information is not involved in the recognition and is only used for locating a sound source); determine the position information and the voiceprint feature information both as the object recognition information when the voice confidence value is greater than or equal to a second confidence threshold and is less than the first confidence threshold, and obtain the object recognition result of the target object according to the object recognition information (that is, perform voiceprint identification on the target object by using the voiceprint feature information, and further recognize the target object by using a sound source direction located by using the position information); and determine the position information as the object recognition information in a case that the voice confidence value is less than the second confidence threshold, and obtain the object recognition result of the target object according to the object recognition information (that is, identify the target object by using only a location direction located by using position information of the sound source).

In the foregoing embodiment, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result.

Figure 4:
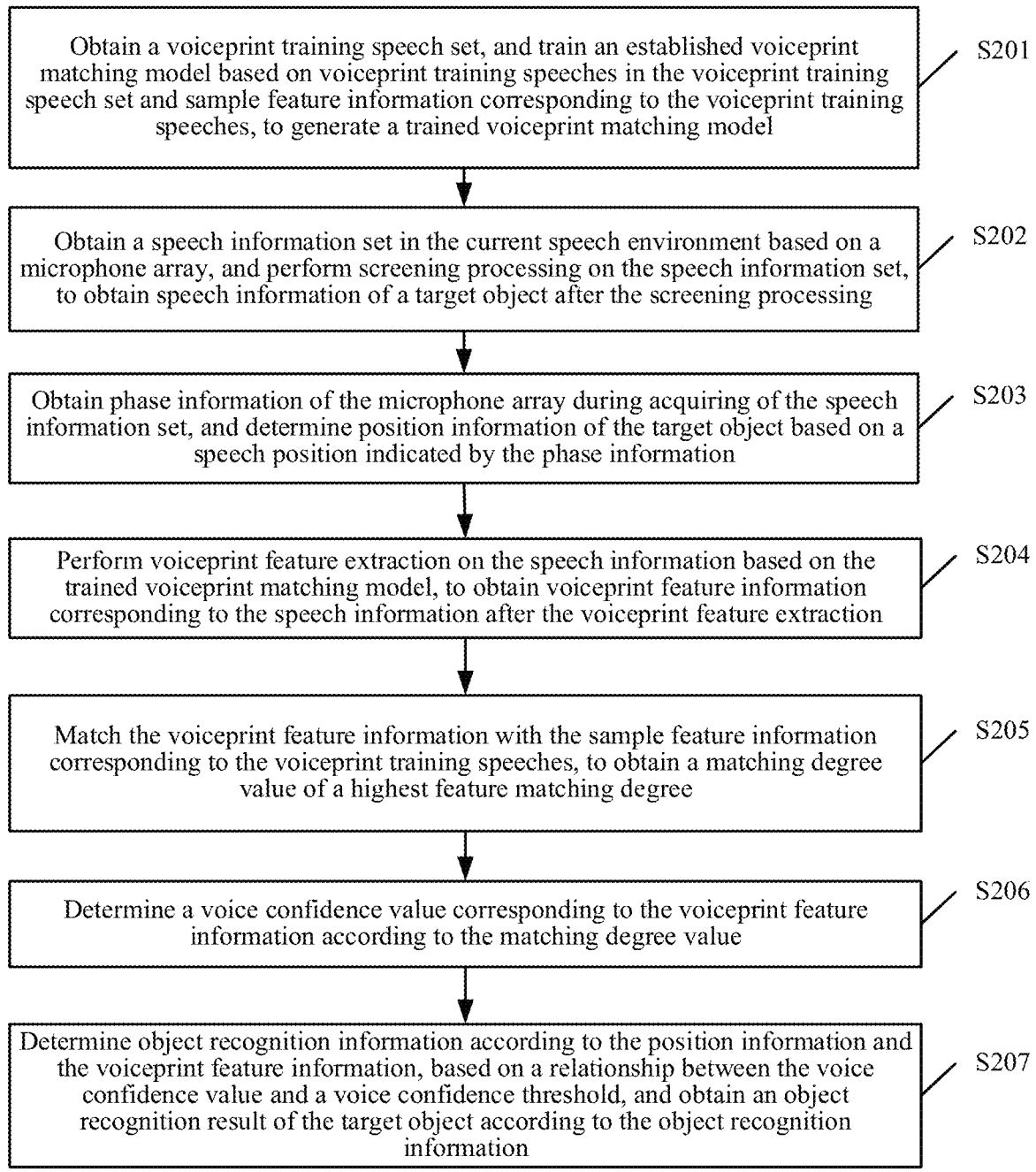
FIG. 4 is a schematic flowchart of another object recognition method according to an embodiment of this application.
Figure 8:
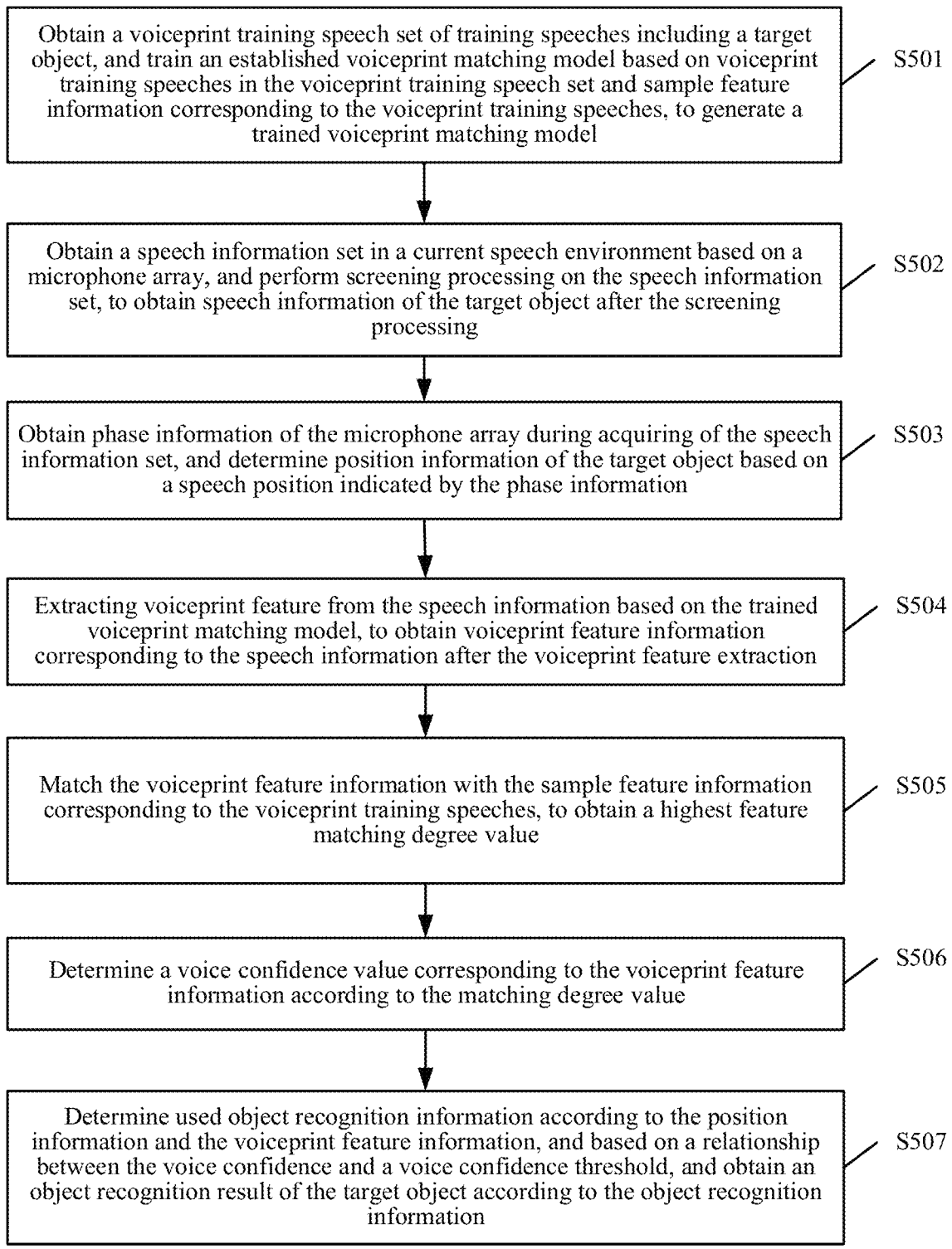
FIG. 8 is a schematic flowchart of another object recognition method according to an embodiment of this application.

Because the voiceprint recognition may be performing identification on a plurality of speakers or performing identity confirmation on a speaker, for an execution process involving speaker identification, refer to the following embodiment shown in FIG. 4, and for an execution process involving speaker identity confirmation, refer to the following embodiment shown in FIG. 8.

FIG. 4 is a schematic flowchart of another object recognition method according to an embodiment of this application. As shown in FIG. 4, in an embodiment, the object recognition method may include the following steps.

S201. Obtain a voiceprint training speech set, and train an established voiceprint matching model based on voiceprint training speeches in the voiceprint training speech set and sample feature information corresponding to the voiceprint training speeches, to generate a trained voiceprint matching model.

Specifically, before performing voiceprint recognition, the object recognition device may obtain the voiceprint training speech set, and train the established voiceprint matching model based on the voiceprint training speeches in the voiceprint training speech set and the sample feature information corresponding to the voiceprint training speeches, to generate the trained voiceprint matching model. It may be understood that, the object recognition device may train the voiceprint matching model by using algorithms such as a neural network, Hidden Markov, or VQ clustering. A speech acquirer corresponding to speeches in a voiceprint training speech set may be a random experimental object, and is not limited to a specific target object. The sample feature information corresponding to the voiceprint training speeches may be voiceprint feature information of the voiceprint training speeches.

S202. Obtain a speech information set in the current speech environment based on a microphone array, and perform screening processing on the speech information set, to obtain speech information of a target object after the screening processing.

Specifically, the speech information set may obtain the speech information set in the current speech environment based on the microphone array. It may be understood that, the speech information in the speech information set may be the speech information of the target object, or may be other unnecessary speech information (for example, speech information of the audience in the court during the court trial case or noise made by other objects). The target object may be a valid sound source object (for example, the judge, the lawyer, the defendant, or the plaintiff during the court trial case) in the current speech environment.

In an embodiment, because not all the speech information in the speech information set is the speech information of the target object, and the object recognition device may perform screening processing on the speech information set, to obtain the speech information of the target object after the screening processing. The screening processing may be filtering out noise through noise reduction, removing echoes, or filtering out speeches of non-target objects according to features (voice loudness, timbre, or other feature information) of speech information of a to-be-processed target object, or may be other speech filtering processing.

S203. Obtain phase information of the microphone array during acquiring of the speech information set, and determine position information of the target object based on a speech position indicated by the phase information.

It may be understood that, the microphone array may obtain the phase information corresponding to the speech information in the speech information set while acquiring the speech information set. Specifically, the object recognition device may obtain the phase information, and may determine the position information of the target object based on the speech position indicated by the phase information. In an embodiment, the phase in the phase information may indicate a scale of a speech waveform of the speech information at a moment, may describe a metric of a waveform change of a speech signal, which usually uses a degree (angle) as a unit, and is also referred to as a phase angle.

Figure 5:
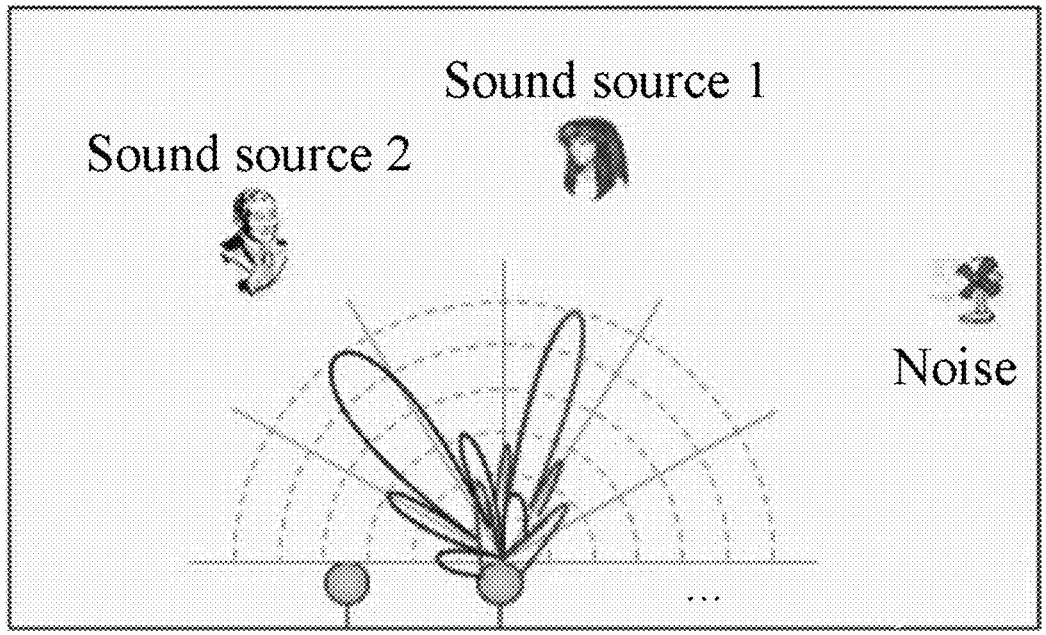
FIG. 5 is a schematic diagram of separated speech displaying based on a beamforming manner according to an embodiment of this application.

In an embodiment, the microphone array may obtain, by using a plurality of microphones, speech information of the same target object acquired from different positions. Because the plurality of microphones is located in different positions in the microphone array, each microphone may obtain the phase information of the target object according to the volume of the sound, and calculate the position information of the target object (that is, determine position information of the target object in the current speech environment) in a beamforming manner according to the obtained phase information. The beamforming manner is shown in FIG. 5, and may be separately forming pickup beams for sound sources in different directions, and suppressing voice in other directions, to perform speech extraction or separation.

S204. Perform voiceprint feature extraction on the speech information based on the trained voiceprint matching model, to obtain voiceprint feature information corresponding to the speech information after the voiceprint feature extraction.

Specifically, the object recognition device may perform the voiceprint feature extraction on the speech information based on the trained voiceprint matching model, to obtain the voiceprint feature information corresponding to the speech information after the voiceprint feature extraction. It may be understood that, the voiceprint feature information may be distinctive feature information in the speech information of the target object, for example, the feature information may be information such as an acoustic spectrum, harmonic peaks, a tone, a pitch, and a reflection ratio.

S205. Match the voiceprint feature information with the sample feature information corresponding to the voiceprint training speeches, to obtain a matching degree value of a highest feature matching degree.

Specifically, the object recognition device may match the voiceprint feature information with the sample feature information corresponding to the voiceprint training speeches, to obtain the matching degree value of the highest feature matching degree.

In an embodiment, voiceprint features of different speakers are different, and voiceprint features of one speaker are even different as the physical status of the speaker or the environment in which the speaker is located changes. Therefore, when voiceprint features of the voiceprint feature information are matched with the sample feature information corresponding to the voiceprint training speeches in the voiceprint training speech set, the obtained matching degree values also vary, but the matching degree value of the highest feature matching degree may be obtained by comparing all matching degree values.

S206. Determine a voice confidence value corresponding to the voiceprint feature information according to the matching degree value.

Specifically, the object recognition device may determine the voice confidence value corresponding to the voiceprint feature information according to the matching degree value. It may be understood that, the voice confidence value may indicate the credibility of a correspondence between the voiceprint feature information and the target object. For example, when the voice confidence value is 90%, it may represent that the credibility of the target object recognized according to the voiceprint feature information corresponding to the voice confidence value is 90%.

In an embodiment, the object recognition device may directly determine the matching degree value as the voice confidence value corresponding to the voiceprint feature information. For example, after the voiceprint feature information is matched with the sample feature information corresponding to the voiceprint training speeches in the voiceprint training speech set, if it is detected that a matching degree between sample feature information of voiceprint training speech A and the voiceprint feature information is the highest, and the highest value is 90%, the object recognition device may determine that the voice confidence value corresponding to the voiceprint feature information is 90%.

S207. Determine object recognition information in the position information and the voiceprint feature information based on a relationship between the voice confidence value and a preset voice confidence value threshold, and obtain an object recognition result of the target object according to the object recognition information.

In an embodiment, the object recognition device may generate the object recognition result of the target object by using the voiceprint feature information. The object recognition result may indicate a target object to which the speech information of the target object belongs. For example, if at least two target objects exist in the current speech environment, the object recognition device may classify speech information of the at least two target objects by using voiceprint feature information of the at least two target objects (for example, speeches of all target objects in a recording system during a court trial are classified into the judge, the defendant, the plaintiff, and the like).

In an embodiment, when two similar voiceprint features exist in the voiceprint feature information, a situation in which the object recognition device cannot accurately obtain the object recognition result of the target object by using the two similar voiceprint features may exist.

For the foregoing situation, the object recognition device may determine the object recognition information in the position information and the voiceprint feature information based on the relationship between the voice confidence value and the preset voice confidence value threshold, and obtain the object recognition result of the target object according to the object recognition information. It may be understood that, the preset voice confidence value may be obtained according to experience of a plurality of recognition processes, and may include at least two preset voice confidence value thresholds. The object recognition information may be used for recognizing the target object, and may include the position information or the voiceprint feature information.

Figure 6:
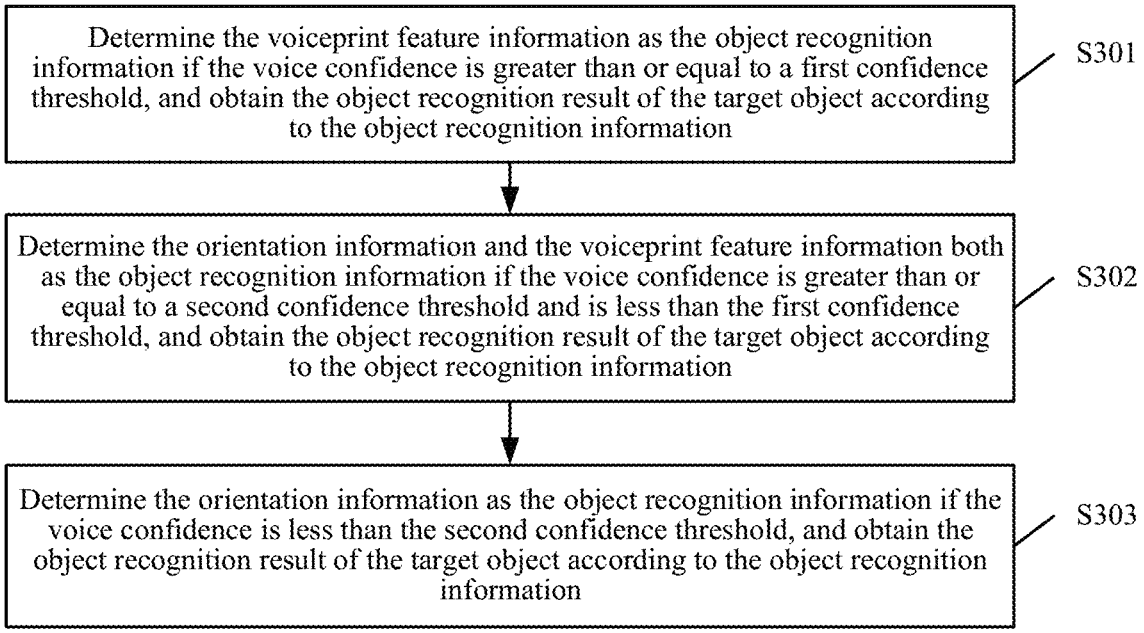
FIG. 6 is a schematic flowchart of another object recognition method according to an embodiment of this application.

In an embodiment, the determining object recognition information in the position information and the voiceprint feature information based on a relationship between the voice confidence value and a preset voice confidence value threshold, and obtaining an object recognition result of the target object according to the object recognition information may include the following steps, as shown in FIG. 6.

S301. Determine the voiceprint feature information as the object recognition information in a case that the voice confidence value is greater than or equal to a first confidence threshold, and obtain the object recognition result of the target object according to the object recognition information.

Specifically, when the voice confidence value is greater than or equal to the first confidence threshold, it may represent that the credibility of the correspondence between the voiceprint feature information and the target object is relatively large, and the object recognition device may determine the voiceprint feature information as the object recognition information, and then identify the target object by using the voiceprint feature information. In this case, the position information is not involved in the recognition but is only used for locating a sound source.

In an embodiment, the first confidence threshold may be set to 90%, 95%, or another value determined according to an actual situation.

S302. Determine the position information and the voiceprint feature information both as the object recognition information when the voice confidence value is greater than or equal to a second confidence threshold and is less than the first confidence threshold, and obtain the object recognition result of the target object according to the object recognition information.

Specifically, when the voice confidence value is greater than or equal to the second confidence threshold and is less than the first confidence threshold, it may represent that the credibility of the correspondence between the voiceprint feature information and the target object is at an average level. To recognize the target object more accurately, the object recognition device may determine the position information and the voiceprint feature information both as the object recognition information, then perform voiceprint recognition by using the voiceprint feature information to initially recognize the target object, and further recognize the target object by using a sound source direction located by using the position information.

In an embodiment, the first confidence threshold may be set to 90%, 95% or another value determined according to an actual situation, and the second confidence threshold may be set to 50%, 55%, 60% or other data that may represent an average value and that is determined according to an actual situation.

S303. Determine the position information as the object recognition information in a case that the voice confidence value is less than the second confidence threshold, and obtain the object recognition result of the target object according to the object recognition information.

Specifically, when the voice confidence value is less than the second confidence threshold, it may represent that the credibility of the correspondence between the voiceprint feature information and the target object is relatively low, and the accuracy of the target object recognized by using the voiceprint feature information is relatively low. The object recognition device may determine the position information as the object recognition information, and then identify the target object by using a location direction located by using position information of the sound source, to implement voice separation in the same speech environment. It may be understood that, when the position information is used as the object recognition information, an error in an allowed range may exist in the recognition process.

In the foregoing embodiment, the object recognition information used for object recognition is determined by using the voice confidence value, thereby avoiding a recognition process for unnecessary information in the object recognition process, and improving object recognition efficiency.

Figure 7:
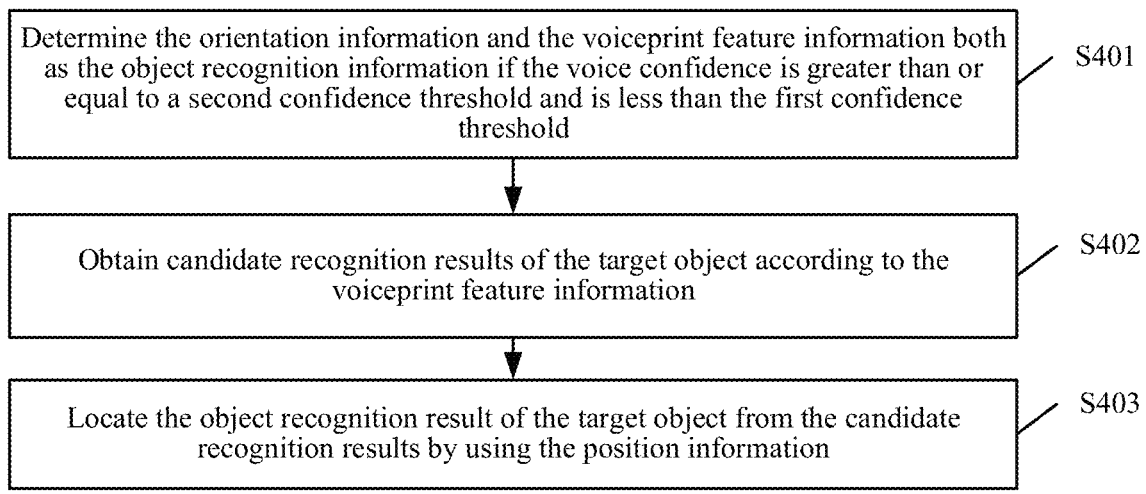
FIG. 7 is a schematic flowchart of another object recognition method according to an embodiment of this application.

In an embodiment, the determining the position information and the voiceprint feature information both as the object recognition information when the voice confidence value is greater than or equal to a second confidence threshold and is less than the first confidence threshold, and obtaining the object recognition result of the target object according to the object recognition information may include the following steps, as shown in FIG. 7.

S401. Determine the position information and the voiceprint feature information both as the object recognition information when the voice confidence value is greater than or equal to a second confidence threshold and is less than the first confidence threshold.

It may be understood that, when the voice confidence value is greater than or equal to the second confidence threshold and is less than the first confidence threshold, it may indicate that the credibility of the correspondence between the voiceprint feature information and the target object is at an average level, that is, when the object recognition result of the target object is recognized according to the voiceprint feature information, the credibility of the determined object recognition result is mediocre. In this case, the object recognition device may determine the position information and the voiceprint feature information both as the object recognition information.

S402. Obtain candidate recognition results of the target object according to the voiceprint feature information.

Specifically, after determining the position information and the voiceprint feature information both as the object recognition information, the object recognition device may obtain the candidate recognition results of the target object according to the voiceprint feature information. In an embodiment, when the voiceprint feature information of target objects is obviously different, the candidate recognition results may be final object recognition results of the target objects, that is, the object recognition device may accurately classify a plurality of pieces of speech information. When at least two target objects with non-obviously different voiceprint feature information exist in the target objects, speech information of the target objects corresponding to the candidate recognition results is not accurately classified. For example, if voiceprint feature information of judge A and prisoner B is very similar, when the object recognition device classifies speech information of them, the speech information of judge A may be classified into the speech information of the prisoner B, or speech information of prisoner B may be classified into the speech information of judge A.

S403. Locate the object recognition result of the target object from the candidate recognition results by using the position information.

Specifically, while the object recognition device initially recognizes the candidate recognition results of the target object according to the voiceprint feature information, the object recognition device may further locate the object recognition result of the target object from the candidate recognition results by using a sound source direction located according to the position information, that is, the object recognition device may adjust the candidate recognition results and finally determine the object recognition result of the target object. For example, if the voiceprint feature information of judge A and prisoner B is very similar, the object recognition device may further accurately classify the speech information of them from the candidate recognition results, that is, the inaccurately classified speech information according to positions in which judge A and prisoner B are located.

In the foregoing embodiment, the object recognition results of the target objects are recognized simultaneously by using the position information and the voiceprint feature information, thereby further increasing the accuracy of the obtained object recognition results.

In the foregoing object recognition method, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result; the object recognition information used for object recognition is determined by using the voice confidence value, thereby avoiding a recognition process for unnecessary information in the object recognition process, and improving object recognition efficiency; and the object recognition results of the target objects are recognized simultaneously by using the position information and the voiceprint feature information, thereby further increasing the accuracy of the obtained object recognition result.

FIG. 8 is a schematic flowchart of another object recognition method according to an embodiment of this application. As shown in FIG. 8, the method of this embodiment of this embodiment may include the following steps.

S501. Obtain a voiceprint training speech set of training speeches including a target object, and train an established voiceprint matching model based on voiceprint training speeches in the voiceprint training speech set and sample feature information corresponding to the voiceprint training speeches, to generate a trained voiceprint matching model.

It may be understood that, identity information of a speaker corresponding to one piece of speech information may be confirmed through voiceprint recognition, and its difference from identifying a target speaker from a plurality of pieces of speech information through voiceprint recognition lies in a process of establishing a voiceprint matching model.

Specifically, the object recognition device may obtain the voiceprint training speech set of training speeches including the target object, and train the established voiceprint matching model based on the voiceprint training speeches in the voiceprint training speech set and the sample feature information corresponding to the voiceprint training speeches, to generate the trained voiceprint matching model. It may be understood that, the object recognition device may train the voiceprint matching model by using algorithms such as a neural network, Hidden Markov, or VQ clustering. A speech acquirer corresponding to the speeches in the voiceprint training speech set is different from that in step S201. In this case, the speech acquirer corresponding to the speeches in the voiceprint training speech set needs to include a target object, and the sample feature information corresponding to the voiceprint training speeches may be voiceprint feature information of the voiceprint training speeches.

S502. Obtain a speech information set in a current speech environment based on a microphone array, and perform screening processing on the speech information set, to obtain speech information of the target object after the screening processing.

S503. Obtain phase information of the microphone array during acquiring of the speech information set, and determine position information of the target object based on a speech position indicated by the phase information.

S504. Perform voiceprint feature extraction on the speech information based on the trained voiceprint matching model, to obtain voiceprint feature information corresponding to the speech information after the voiceprint feature extraction.

S505. Match the voiceprint feature information with the sample feature information corresponding to the voiceprint training speeches, to obtain a matching degree value of a highest feature matching degree.

S506. Determine a voice confidence value corresponding to the voiceprint feature information according to the matching degree value.

S507. Determine object recognition information in the position information and the voiceprint feature information based on a relationship between the voice confidence value and a preset voice confidence value threshold, and obtain an object recognition result of the target object according to the object recognition information.

It may be understood that, the object recognition device may generate the object recognition result of the target object by using the voiceprint feature information, and the object recognition result may indicate identity information of the target object corresponding to the speech information of the target object. For example, if at least two target objects exist in the current speech environment, the object recognition device may determine a target object corresponding to speech information of the at least two target objects by using voiceprint feature information of the at least two target objects, and determine identity information of the target object (for example, after speeches of all target objects in a recording system during a court trial are classified into the judge, the defendant, and the plaintiff, it may be determined that voice A belongs to the judge, voice B belongs to the defendant, the voice C belongs to the plaintiff, and the like).

In an embodiment, when two similar voiceprint features exist in the voiceprint feature information, a situation in which the object recognition device cannot accurately obtain the object recognition result of the target object by using the two similar voiceprint features may exist.

For the foregoing situation, the object recognition device may determine the object recognition information in the position information and the voiceprint feature information based on the relationship between the voice confidence value and the preset voice confidence value threshold, and obtain the object recognition result of the target object according to the object recognition information.

In an embodiment, the determining object recognition information in the position information and the voiceprint feature information based on a relationship between the voice confidence value and a preset voice confidence value threshold, and obtaining an object recognition result of the target object according to the object recognition information may include the following steps. For details, reference may be made to the process shown in FIG. 6.

S301. Determine the voiceprint feature information as the object recognition information in a case that the voice confidence value is greater than or equal to a first confidence threshold, and obtain the object recognition result of the target object according to the object recognition information.

Specifically, when the voice confidence value is greater than or equal to the first confidence threshold, it may represent that the credibility of the identity information of the target object confirmed according to the voiceprint feature information is relatively large, the object recognition device may determine the voiceprint feature information as the object recognition information, and then recognize the identity information of the target object by using the voiceprint feature information. In this case, the position information is not involved in the identity confirmation but is only used for locating a sound source.

In an embodiment, the first confidence threshold may be set to 90%, 95%, or another value determined according to an actual situation.

S302. Determine the position information and the voiceprint feature information both as the object recognition information in a case that the voice confidence value is greater than or equal to a second confidence threshold and is less than the first confidence threshold, and obtain the object recognition result of the target object according to the object recognition information.

Specifically, when the voice confidence value is greater than or equal to the second confidence threshold and is less than the first confidence threshold, it may represent that the credibility of the identity information of the target object confirmed according to the voiceprint feature information is at an average level. To recognize the identity of the target object more accurately, the object recognition device may determine the position information and the voiceprint feature information both as the object recognition information, then perform voiceprint recognition by using the voiceprint feature information to initially determine the identity of the target object, and further recognize the identity of the target object by using a sound source direction located by using the position information.

In an embodiment, the first confidence threshold may be set to 90%, 95% or another value determined according to an actual situation, and the second confidence threshold may be set to 50%, 55%, 60% or other data that may represent an average value and that is determined according to an actual situation.

S303. Determine the position information as the object recognition information in a case that the voice confidence value is less than the second confidence threshold, and obtain the object recognition result of the target object according to the object recognition information.

Specifically, when the voice confidence value is less than the second confidence threshold, it may represent that the credibility of identity information of the target object confirmed according to the voiceprint feature information is relatively low, and the accuracy of the target object recognized by using the voiceprint feature information is relatively low. The object recognition device may determine the position information as the object recognition information, and then determine the identity of the target object by using a location direction located by using position information of the sound source, to implement voice separation in the same speech environment. It may be understood that, when the position information is used as the object recognition information, an error in an allowed range may exist in the recognition process. In this case, the current speech environment needs to be a specific speech environment, for example, an environment in which the position of the target object is determined (for example, positions of the judge and the prisoner are determined in a court trial).

In the foregoing embodiment, the object recognition information used for object recognition is determined by using the voice confidence value, thereby avoiding a recognition process for unnecessary information in the object recognition process, and improving object recognition efficiency.

In an embodiment, the determining the position information and the voiceprint feature information both as object recognition information when the voice confidence value is greater than or equal to a second confidence threshold and is less than the first confidence threshold, and obtaining an object recognition result of the target object according to the object recognition information may include the following steps. For details, reference may be made to the process shown in FIG. 7:

S401. Determine the position information and the voiceprint feature information both as the object recognition information when the voice confidence value is greater than or equal to the second confidence threshold and is less than the first confidence threshold.

S402. Obtain candidate recognition results of the target object according to the voiceprint feature information.

Specifically, after determining the position information and the voiceprint feature information both as the object recognition information, the object recognition device may obtain the candidate recognition results of the target object according to the voiceprint feature information. In an embodiment, when the voiceprint feature information of the target object is obviously different, the candidate recognition results may be final object recognition results of the target object, that is, the object recognition device may clearly recognize the speech information of the target object from a plurality of pieces of speech information; when at least two target objects with non-obviously different voiceprint feature information exist in the target objects, the correspondence between the target object indicated by the candidate recognition result and the speech information may be inaccurate. For example, if the voiceprint feature information of judge A and prisoner B is very similar, the object recognition device may mistake the speech information of prisoner B for the speech information of judge A or mistake the speech information of judge A for the speech information of prisoner B when recognizing the speech information of judge A from the plurality of pieces of speech information in the court trial.

S403. Locate the object recognition result of the target object from the candidate recognition results by using the position information.

Specifically, while the object recognition device initially recognizes the candidate recognition results of the target object according to the voiceprint feature information, the object recognition device may further locate the object recognition result of the target object from the candidate recognition results by using a sound source direction located according to the position information, that is, the object recognition device may adjust the candidate recognition results and finally determine the object recognition result of the target object. For example, voiceprint feature information of judge A and prisoner B is very similar, the candidate recognition result indicates that speech information of judge A corresponds to prisoner B, and the object recognition device may correspond speech information of judge A to judge A with reference to position information of judge A.

In the foregoing embodiment, the object recognition results of the target objects are recognized simultaneously by using the position information and the voiceprint feature information, thereby further increasing the accuracy of the obtained object recognition result.

In the foregoing object recognition method, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result; the object recognition information used for object recognition is determined by using the voice confidence value, thereby avoiding a recognition process for unnecessary information in the object recognition process, and improving object recognition efficiency; and the object recognition results of the target objects are recognized simultaneously by using the position information and the voiceprint feature information, thereby further increasing the accuracy of the obtained object recognition result.

The following describes the object recognition device provided in the embodiments of this application in detail with reference to FIG. 9 to FIG. 14. The device shown in FIG. 9 to FIG. 14 is configured to perform the methods in the embodiments shown in FIG. 3 to FIG. 8 of this application. For ease of description, only a part related to the embodiments of this application is shown. For specific technical details that are not disclosed, refer to the embodiments shown in FIG. 3 to FIG. 8 of this application.

Figure 9:
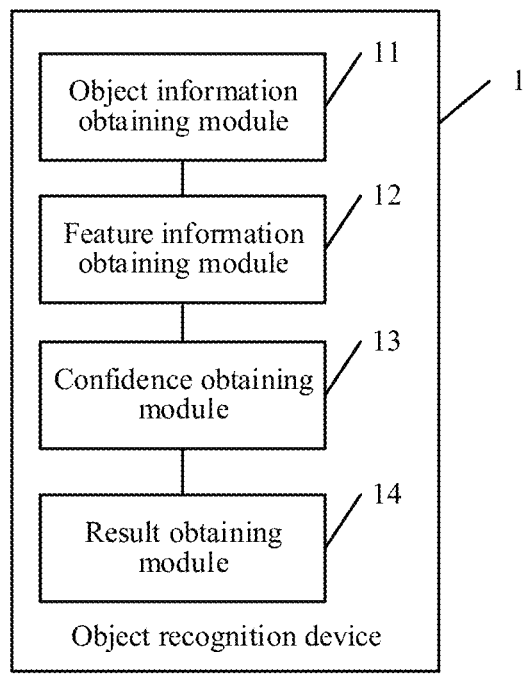
FIG. 9 is a schematic structural diagram of an object recognition device according to an embodiment of this application.

FIG. 9 is a schematic structural diagram of an object recognition device according to an embodiment of this application. As shown in FIG. 9, the object recognition device 1 in this embodiment of this application may include: an object information obtaining module 11, a feature information obtaining module 12, a confidence obtaining module 13, and a result obtaining module 14.

The object information obtaining module 11 is configured to obtain speech information of a target object in a current speech environment and position information of the target object.

In specific implementation, the object information obtaining module 11 may obtain the speech information of the target object in the current speech environment based on a microphone array, and obtain the position information of the target object based on the microphone array. It may be understood that, the target object may be a valid sound source object (for example, the judge, the lawyer, the defendant, or the plaintiff during a court trial case) in the current speech environment. The speech information in the speech information set obtained in the current speech environment by the object information obtaining module 11 may be the speech information of the target object, or may be other unnecessary speech information (for example, speech information of the audience in the court during the court trial case or noise made by other objects). After obtaining the speech information set in the current speech environment, the object information obtaining module 11 may perform screening processing on the speech information, to obtain the speech information of the target object.

In this embodiment of this application, the microphone array may obtain, by using a plurality of microphones, speech information of the same target object acquired from different positions. Because the plurality of microphones are located in different positions in the microphone array, each microphone may obtain phase information of the target object according to the volume of the sound, and calculate the position information of the target object (that is, determine position information of the target object in the current speech environment) in a beamforming manner according to the obtained phase information.

The feature information obtaining module 12 is configured to perform voiceprint feature extraction on the speech information based on a trained voiceprint matching model, to obtain voiceprint feature information corresponding to the speech information after the voiceprint feature extraction In an embodiment, the feature information obtaining module 12 may perform the voiceprint feature extraction based on the speech information of the trained voiceprint matching model. It may be understood that, the voiceprint matching model may be a model established after voiceprint training speeches in a pre-acquired voiceprint training speech set and sample feature information corresponding to the voiceprint training speeches are trained by using a training algorithm (for example, a neural network method, a Hidden Markov method, or a VQ clustering method). It may be understood that, a speech acquirer corresponding to speeches in a voiceprint training speech set may be a random experimental object, and is not limited to a specific target object. The sample feature information corresponding to the voiceprint training speeches may be voiceprint feature information of the voiceprint training speeches. Further, the feature information obtaining module 12 may obtain the voiceprint feature information corresponding to the speech information after the voiceprint feature extraction. It may be understood that, the voiceprint feature information may be distinctive feature information in the speech information of the target object, for example, the feature information may be information such as an acoustic spectrum, harmonic peaks, a tone, a pitch, and a reflection ratio.

The confidence obtaining module 13 is configured to obtain a voice confidence value corresponding to the voiceprint feature information.

In an embodiment, the confidence obtaining module 13 may obtain the voice confidence value corresponding to the voiceprint feature information. It may be understood that, the voice confidence value may indicate the credibility of a correspondence between the voiceprint feature information and the target object. For example, when the voice confidence value is 90%, it may represent that the credibility of the target object recognized according to the voiceprint feature information corresponding to the voice confidence value is 90%.

In an embodiment, the confidence obtaining module 13 may match the voiceprint feature information with the sample feature information corresponding to the voiceprint training speeches, to obtain a matching degree value of a highest feature matching degree, and then determine the voice confidence value corresponding to the voiceprint feature information according to the matching degree value. For example, after the voiceprint feature information is matched with the sample feature information corresponding to the voiceprint training speeches in the voiceprint training speech set, if it is detected that a matching degree between sample feature information of voiceprint training speech A and the voiceprint feature information is the highest, and the highest value is 90%, the object recognition device may determine that the voice confidence value corresponding to the voiceprint feature information is 90%.

The result obtaining module 14 is configured to obtain an object recognition result of the target object by using the position information, the voiceprint feature information, and the voice confidence value.

It may be understood that, the object recognition device 1 may generate the object recognition result of the target object by using the voiceprint feature information, and the object recognition result may indicate a target object to which the speech information of the target object belongs. For example, if at least two target objects exist in the current speech environment, the object recognition device may classify speech information of the at least two target objects by using voiceprint feature information of the at least two target objects (for example, speeches of all target objects in a recording system during a court trial are classified into the judge, the defendant, the plaintiff, and the like).

In an embodiment, when two similar voiceprint features exist in the voiceprint feature information, a situation in which the object recognition device 1 cannot accurately obtain the object recognition result of the target object by using the two similar voiceprint features may exist.

For the foregoing situation, the, result obtaining module 14 may obtain the object recognition result of the target object based on the voice confidence value and by using the position information and the voiceprint feature information. In specific implementation, the result obtaining module 14 may determine, based on a relationship between the voice confidence value and a preset voice confidence value threshold, object recognition information used for recognizing the object recognition result of the target object, and then obtain the object recognition result according to the object recognition information. It may be understood that, the object recognition information may be the position information or the voiceprint feature information.

In a specific implementation of this application, the result obtaining module 14 may determine the voiceprint feature information as the object recognition information in a case that the voice confidence value is greater than or equal to a first confidence threshold, and obtain the object recognition result of the target object according to the object recognition information (that is, identify the target object by using the voiceprint feature information, but the position information is not involved in the recognition and is only used for locating a sound source); and determine the position information and the voiceprint feature information both as the object recognition information when the voice confidence value is greater than or equal to a second confidence threshold and is less than the first confidence threshold, and obtain the object recognition result of the target object according to the object recognition information (that is, perform voiceprint identification on the target object by using the voiceprint feature information, and further recognize the target object by using a sound source direction located by using the position information); and determine the position information as the object recognition information in a case that the voice confidence value is less than the second confidence threshold, and obtain the object recognition result of the target object according to the object recognition information (that is, that is, identify the target object by using only a location direction located by using position information of the sound source).

In this embodiment of this application, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result.

Figure 10:
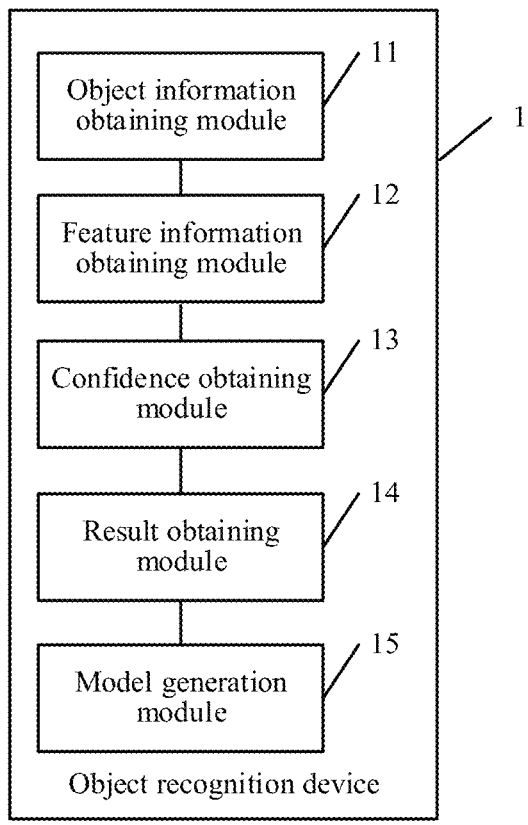
FIG. 10 is a schematic structural diagram of another object recognition device according to an embodiment of this application.

Because the voiceprint recognition may be performing identification on a plurality of speakers or performing identity confirmation on a speaker, for an execution process involving speaker identification, refer to a first implementation shown in FIG. 10, and for an execution process involving speaker identity confirmation, refer to a second implementation shown in FIG. 10.

FIG. 10 is a schematic structural diagram of another object recognition device according to an embodiment of this application. As shown in FIG. 10, the object recognition device 1 in this embodiment of this application may include: an object information obtaining module 11, a feature information obtaining module 12, a confidence obtaining module 13, a result obtaining module 14, and a model generation module 15. In the first implementation of the embodiment shown in FIG. 10.

The model generation module 15 is configured to obtain a voiceprint training speech set, and train an established voiceprint matching model based on voiceprint training speeches in the voiceprint training speech set and sample feature information corresponding to the voiceprint training speeches, to generate a trained voiceprint matching model.

In an embodiment, before performing voiceprint recognition, the model generation module 15 may obtain the voiceprint training speech set, and train the established voiceprint matching model based on the voiceprint training speeches in the voiceprint training speech set and the sample feature information corresponding to the voiceprint training speeches, to generate the trained voiceprint matching model. It may be understood that, the model generation module 15 may train the voiceprint matching model by using algorithms such as a neural network, Hidden Markov, or VQ clustering. A speech acquirer corresponding to speeches in a voiceprint training speech set may be a random experimental object, and is not limited to a specific target object. The sample feature information corresponding to the voiceprint training speeches may be voiceprint feature information of the voiceprint training speeches.

The object information obtaining module 11 is configured to obtain speech information of a target object in a current speech environment and position information of the target object.

In an embodiment, the object information obtaining module 11 may obtain the speech information of the target object in the current speech environment and the position information of the target object.

Figure 11:
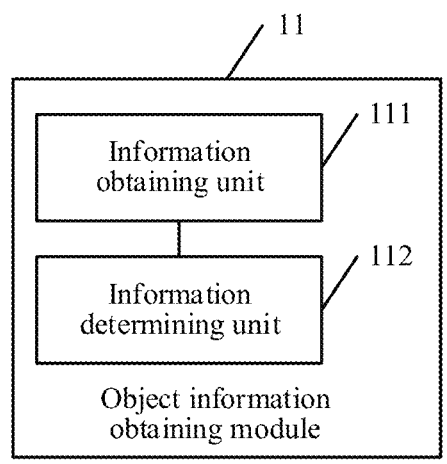
FIG. 11 is a schematic structural diagram of an object information obtaining module according to an embodiment of this application.

FIG. 11 is a schematic structural diagram of the object information obtaining module according to this embodiment of this application. As shown in FIG. 11, the object information obtaining module 11 may include an information obtaining unit 111 and an information determining unit 112.

The information obtaining unit 111 is configured to obtain a speech information set in the current speech environment based on a microphone array, and perform screening processing on the speech information set, to obtain object speech information of a target object after the screening processing.

In an embodiment, the information obtaining unit 111 may obtain the speech information set in the current speech environment based on the microphone array. It may be understood that, the speech information in the speech information set may be the speech information of the target object, or may be other unnecessary speech information (for example, speech information of the audience in the court during the court trial case or noise made by other objects). The target object may be a valid sound source object (for example, the judge, the lawyer, the defendant, or the plaintiff during the court trial case) in the current speech environment.

In an embodiment, because not all the speech information in the speech information set is the speech information of the target object, and the information obtaining unit 111 may perform screening processing on the speech information set, to obtain the speech information of the target object after the screening processing. The screening processing may be filtering out noise through noise reduction, removing echoes, or filtering out speeches of non-target objects according to features (voice loudness, timbre, or other feature information) of speech information of a to-be-processed target object, or may be other speech filtering processing.

The information determining unit 112 is configured to obtain phase information of the microphone array during acquiring of the speech information set, and determine the position information of the target object based on a speech position indicated by the phase information.

In an embodiment, the microphone array may obtain the phase information corresponding to the speech information in the speech information set while acquiring the speech information set. In specific implementation, the information determining unit 112 may obtain the phase information, and may determine the position information of the target object based on the speech position indicated by the phase information. In an embodiment, the phase in the phase information may indicate a scale of a speech waveform of the speech information at a moment, may describe a metric of a waveform change of a speech signal, which usually uses a degree (angle) as a unit, and is also referred to as a phase angle.

In an embodiment, the microphone array may obtain, by using a plurality of microphones, speech information of the same target object acquired from different positions. Because the plurality of microphones are is located in different positions in the microphone array, each microphone may obtain the phase information of the target object according to the volume of the sound, and calculate the position information of the target object (that is, determine position information of the target object in the current speech environment) in a beamforming manner according to the obtained phase information. The beamforming manner is shown in FIG. 5, and may be separately forming pickup beams for sound sources in different directions, and suppressing voice in other directions, to perform speech extraction or separation.

The feature information obtaining module 12 is configured to perform voiceprint feature extraction on the speech information based on the trained voiceprint matching model, to obtain voiceprint feature information corresponding to the speech information after the voiceprint feature extraction.

In an embodiment, the feature information obtaining module 12 may perform the voiceprint feature extraction on the speech information based on the trained voiceprint matching model, to obtain the voiceprint feature information corresponding to the speech information after the voiceprint feature extraction. It may be understood that, the voiceprint feature information may be distinctive feature information in the speech information of the target object, for example, the feature information may be information such as an acoustic spectrum, harmonic peaks, a tone, a pitch, and a reflection ratio.

The confidence obtaining module 13 is configured to obtain a voice confidence value corresponding to the voiceprint feature information.

In specific implementation, the confidence obtaining module 13 may obtain the voice confidence value corresponding to the voiceprint feature information.

Figure 12:
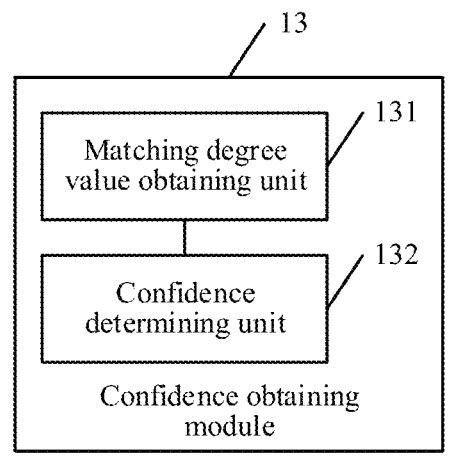
FIG. 12 is a schematic structural diagram of a confidence obtaining module according to an embodiment of this application.

FIG. 12 is a schematic structural diagram of the confidence obtaining module according to this embodiment of this application. As shown in FIG. 12, the confidence obtaining module 13 may include a matching degree value obtaining unit 131 and a confidence determining unit 132.

The matching degree value obtaining unit 131 is configured to match the voiceprint feature information with the sample feature information corresponding to the voiceprint training speeches, to obtain a matching degree value of a highest feature matching degree.

In an embodiment, the matching degree value obtaining unit 131 may match the voiceprint feature information with the sample feature information corresponding to the voiceprint training speeches, to obtain the matching degree value of the highest feature matching degree. It may be understood that, voiceprint features of different speakers are different, and voiceprint features of one speaker are even different as the physical status of the speaker or the environment in which the speaker is located changes. Therefore, when voiceprint features of the voiceprint feature information are matched with the sample feature information corresponding to the voiceprint training speeches in the voiceprint training speech set, the obtained matching degree values also vary, but the matching degree value of the highest feature matching degree may be obtained by comparing all matching degree values.

The confidence determining unit 132 is configured to determine a voice confidence value corresponding to the voiceprint feature information according to the matching degree value.

In an embodiment, the confidence determining unit 132 may determine the voice confidence value corresponding to the voiceprint feature information according to the matching degree value. It may be understood that, the voice confidence value may indicate the credibility of a correspondence between the voiceprint feature information and the target object. For example, when the voice confidence value is 90%, it may represent that the credibility of the target object recognized according to the voiceprint feature information corresponding to the voice confidence value is 90%.

In an embodiment, the confidence determining unit 132 may directly determine the matching degree value as the voice confidence value corresponding to the voiceprint feature information. For example, after the voiceprint feature information is matched with the sample feature information corresponding to the voiceprint training speeches in the voiceprint training speech set, if it is detected that a matching degree between sample feature information of voiceprint training speech A and the voiceprint feature information is the highest, and the highest value is 90%, the object recognition device may determine that the voice confidence value corresponding to the voiceprint feature information is 90%.

The result obtaining module 14 is specifically configured to determine object recognition information in the position information and the voiceprint feature information based on a relationship between the voice confidence value and a preset voice confidence value threshold, and obtain an object recognition result of the target object according to the object recognition information.

In an embodiment, the object recognition device 1 may generate the object recognition result of the target object by using the voiceprint feature information. The object recognition result may indicate a target object to which the speech information of the target object belongs. For example, if at least two target objects exist in the current speech environment, the object recognition device may classify speech information of the at least two target objects by using voiceprint feature information of the at least two target objects (for example, speeches of all target objects in a recording system during a court trial are classified into the judge, the defendant, the plaintiff, and the like).

In an embodiment, when two similar voiceprint features exist in the voiceprint feature information, a situation in which the object recognition device cannot accurately obtain the object recognition result of the target object by using the two similar voiceprint features may exist.

For the foregoing situation, the result obtaining module 14 may determine the object recognition information in the position information and the voiceprint feature information based on the relationship between the voice confidence value and the preset voice confidence value threshold, and obtain the object recognition result of the target object according to the object recognition information. It may be understood that, the preset voice confidence value may be obtained according to experience of a plurality of recognition processes, and may include at least two preset voice confidence value thresholds. The object recognition information may be used for recognizing the target object, and may include the position information or the voiceprint feature information.

Figure 13:
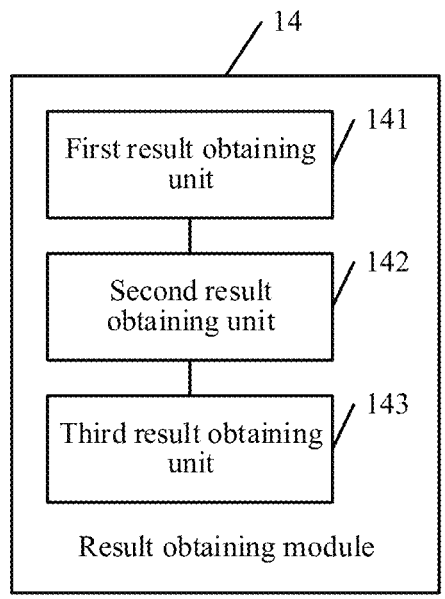
FIG. 13 is a schematic structural diagram of a result obtaining module according to an embodiment of this application.

In a specific implementation of this embodiment of this application, the result obtaining module 14 may include a first result obtaining unit 141, a second result obtaining unit 142, and a third result obtaining unit 143, as shown in FIG. 13.

The first result obtaining unit 141 is configured to determine the voiceprint feature information as the object recognition information in a case that the voice confidence value is greater than or equal to a first confidence threshold, and obtain the object recognition result of the target object according to the object recognition information.

In an embodiment, when the voice confidence value is greater than or equal to the first confidence threshold, it may represent that the credibility of the correspondence between the voiceprint feature information and the target object is relatively large, and the first result obtaining unit 141 may determine the voiceprint feature information as the object recognition information, and then identify the target object by using the voiceprint feature information. In this case, the position information is not involved in the recognition but is only used for locating a sound source.

In an embodiment, the first confidence threshold may be set to 90%, 95%, or another value determined according to an actual situation.

The second result obtaining unit 142 is configured to determine the position information and the voiceprint feature information as the object recognition information in a case that the voice confidence value is greater than or equal to a second confidence threshold and is less than the first confidence threshold, and obtain the object recognition result of the target object according to the object recognition information.

In an embodiment, when the voice confidence value is greater than or equal to the second confidence threshold and is less than the first confidence threshold, it may represent that the credibility of the correspondence between the voiceprint feature information and the target object is at an average level. To recognize the target object more accurately, the second result obtaining unit 142 may determine the position information and the voiceprint feature information both as the object recognition information, then perform voiceprint recognition by using the voiceprint feature information to initially recognize the target object, and further recognize the target object by using a sound source direction located by using the position information.

In an embodiment, the first confidence threshold may be set to 90%, 95% or another value determined according to an actual situation, and the second confidence threshold may be set to 50%, 55%, 60% or other data that may represent an average value and that is determined according to an actual situation.

The third result obtaining unit 143 is configured to determine the position information as the object recognition information in a case that the voice confidence value is less than the second confidence threshold, and obtain the object recognition result of the target object according to the object recognition information.

In an embodiment, when the voice confidence value is less than the second confidence threshold, it may represent that the credibility of the correspondence between the voiceprint feature information and the target object is relatively low, and the accuracy of the target object recognized by using the voiceprint feature information is relatively low. The third result obtaining unit 143 may determine the position information as the object recognition information, and then identify the target object by using a location direction located by using position information of the sound source, to implement voice separation in the same speech environment. It may be understood that, when the position information is used as the object recognition information, an error in an allowed range may exist in the recognition process.

In this embodiment of this application, the object recognition information used for object recognition is determined by using the voice confidence value, thereby avoiding a recognition process for unnecessary information in the object recognition process, and improving object recognition efficiency.

Figure 14:
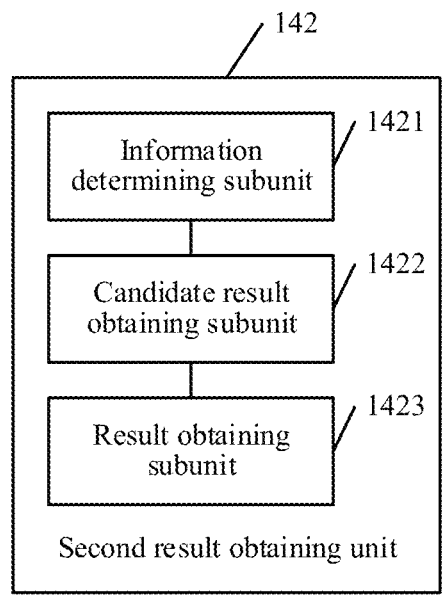
FIG. 14 is a schematic structural diagram of a second result obtaining unit according to an embodiment of this application.

In an embodiment, the second result obtaining unit 142 may include an information determining subunit 1421, a candidate result obtaining subunit 1422, and a result obtaining subunit 1423, as shown in FIG. 14.

The information determining subunit 1421 is configured to determine the position information and the voiceprint feature information both as the object recognition information in a case that the voice confidence value is greater than or equal to a second confidence threshold and is less than the first confidence threshold.

In an embodiment, when the voice confidence value is greater than or equal to the second confidence threshold and is less than the first confidence threshold, it may indicate that the credibility of the correspondence between the voiceprint feature information and the target object is at an average level, that is, when the object recognition result of the target object is recognized according to the voiceprint feature information, the credibility of the determined object recognition result is mediocre. In this case, the information determining subunit 1421 may determine the position information and the voiceprint feature information both as the object recognition information.

The candidate result obtaining subunit 1422 is configured to obtain candidate recognition results of the target object according to the voiceprint feature information.

In an embodiment, after the information determining subunit 1421 determines the position information and the voiceprint feature information both as the object recognition information, the candidate result obtaining subunit 1422 may obtain the candidate recognition results of the target object according to the voiceprint feature information. It may be understood that, when the voiceprint feature information of target objects is obviously different, the candidate recognition results may be final object recognition results of the target objects, that is, the object recognition device may accurately classify a plurality of pieces of speech information. When at least two target objects with non-obviously different voiceprint feature information exist in the target objects, speech information of the target objects corresponding to the candidate recognition results is not accurately classified. For example, if voiceprint feature information of judge A and prisoner B is very similar, when the object recognition device classifies speech information of them, the speech information of judge A may be classified into the speech information of the prisoner B, or speech information of prisoner B may be classified into the speech information of judge A.

The result obtaining subunit 1423 is configured to locate the object recognition result of the target object from the candidate recognition results by using the position information.

In an embodiment, while the candidate result obtaining subunit 1422 initially recognizes the candidate recognition results of the target object according to the voiceprint feature information, the result obtaining subunit 1423 may further locate the object recognition result of the target object from the candidate recognition results by using a sound source direction located according to the position information, that is, the result obtaining subunit 1423 may adjust the candidate recognition results and finally determine the object recognition result of the target object. For example, if the voiceprint feature information of judge A and prisoner B is very similar, the object recognition device may further accurately classify the speech information of them from the candidate recognition results, that is, the inaccurately classified speech information according to positions in which judge A and prisoner B are located.

In this embodiment of this application, the object recognition results of the target objects are recognized simultaneously by using the position information and the voiceprint feature information, thereby further increasing the accuracy of the obtained object recognition result.

In this embodiment of this application, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result; the object recognition information used for object recognition is determined by using the voice confidence value, thereby avoiding a recognition process for unnecessary information in the object recognition process, and improving object recognition efficiency; and the object recognition results of the target objects are recognized simultaneously by using the position information and the voiceprint feature information, thereby further increasing the accuracy of the obtained object recognition result.

In the second implementation of the embodiment shown in FIG. 10:

The model generation module 15 is specifically configured to obtain a voiceprint training speech set of training speeches including a target object, and train an established voiceprint matching model based on voiceprint training speeches in the voiceprint training speech set and sample feature information corresponding to the voiceprint training speeches, to generate a trained voiceprint matching model.

It may be understood that, identity information of a speaker corresponding to one piece of speech information may be confirmed through voiceprint recognition, and its difference from identifying a target speaker from a plurality of pieces of speech information through voiceprint recognition lies in a process of establishing a voiceprint matching model.

In an embodiment, the model generation module 15 may obtain the voiceprint training speech set of training speeches including the target object, and train the established voiceprint matching model based on the voiceprint training speeches in the voiceprint training speech set and the sample feature information corresponding to the voiceprint training speeches, to generate the trained voiceprint matching model. It may be understood that, the model generation module 15 may train the voiceprint matching model by using algorithms such as a neural network, Hidden Markov, or VQ clustering. A speech acquirer corresponding to the speeches in the voiceprint training speech set is different from that in the model generation module 15 in the first implementation in the embodiment shown in FIG. 8. In this case, the speech acquirer corresponding to the speeches in the voiceprint training speech set needs to include a target object, and the sample feature information corresponding to the voiceprint training speeches may be voiceprint feature information of the voiceprint training speeches.

The object information obtaining module 11 is configured to obtain speech information of a target object in a current speech environment and position information of the target object.

In an embodiment, the object information obtaining module 11 may obtain the speech information of the target object in the current speech environment and the position information of the target object.

FIG. 11 is a schematic structural diagram of the object information obtaining module according to this embodiment of this application. As shown in FIG. 11, the object information obtaining module 11 may include an information obtaining unit 111 and an information determining unit 112.

The information obtaining unit 111 is configured to obtain a speech information set in a current speech environment based on a microphone array, and perform screening processing on the speech information set, to obtain speech information of the target object after the screening processing.

In an embodiment, for the detailed process of the information obtaining unit 111 obtaining the speech information of the target object, reference may be made to the description in the foregoing method embodiments. Details are not described herein again.

The information determining unit 112 is configured to obtain phase information of the microphone array during acquiring of the speech information set, and determine position information of the target object based on a speech position indicated by the phase information.

In specific implementation, for the detailed process of the information determining unit 112 obtaining the position information of the target object, reference may be made to the description in the foregoing method embodiments. Details are not described herein again.

The feature information obtaining module 12 is configured to perform voiceprint feature extraction on the speech information based on the trained voiceprint matching model, to obtain voiceprint feature information corresponding to the speech information after the voiceprint feature extraction.

In specific implementation, for the detailed process of the feature information obtaining module 12 obtaining the voiceprint feature information, reference may be made to the description in the foregoing method embodiments. Details are not described herein again.

The confidence obtaining module 13 is configured to obtain a voice confidence value corresponding to the voiceprint feature information.

In specific implementation, the confidence obtaining module 13 may obtain the voice confidence value corresponding to the voiceprint feature information.

FIG. 12 is a schematic structural diagram of the confidence obtaining module according to this embodiment of this application. As shown in FIG. 12, the confidence obtaining module 13 may include a matching degree value obtaining unit 131 and a confidence determining unit 132.

The matching degree value obtaining unit 131 is configured to match the voiceprint feature information with the sample feature information corresponding to the voiceprint training speeches, to obtain a matching degree value of a highest feature matching degree.

In specific implementation, for the detailed process of the matching degree value obtaining unit 131 obtaining the matching degree value, reference may be made to the description in the foregoing method embodiments. Details are not described herein again.

The confidence determining unit 132 is configured to determine the voice confidence value corresponding to the voiceprint feature information according to the matching degree value.

In specific implementation, for the detailed process of the confidence determining unit 132 determining the voice confidence value, reference may be made to the description in the foregoing method embodiments. Details are not described herein again.

The result obtaining module 14 is specifically configured to determine the object recognition information in the position information and the voiceprint feature information based on a relationship between the voice confidence value and the preset voice confidence value threshold, and obtain an object recognition result of the target object according to the object recognition information.

It may be understood that, the object recognition device 1 may generate the object recognition result of the target object by using the voiceprint feature information, and the object recognition result may indicate identity information of a target object corresponding to the speech information of the target object. For example, if at least two target objects exist in the current speech environment, the object recognition device 1 may determine a target object corresponding to speech information of the at least two target objects by using voiceprint feature information of the at least two target objects, and determine identity information of the target object (for example, after speeches of all target objects in a recording system during a court trial are classified into the judge, the defendant, and the plaintiff, it may be determined that voice A belongs to the judge, voice B belongs to the defendant, the voice C belongs to the plaintiff, and the like).

In an embodiment, when two similar voiceprint features exist in the voiceprint feature information, a situation in which the object recognition device 1 cannot accurately obtain the object recognition result of the target object by using the two similar voiceprint features may exist.

For the foregoing situation, the result obtaining module 14 may determine the object recognition information in the position information and the voiceprint feature information based on the relationship between the voice confidence value and the preset voice confidence value threshold, and obtain the object recognition result of the target object according to the object recognition information.

In a specific implementation of this embodiment of this application, the result obtaining module 14 may include a first result obtaining unit 141, a second result obtaining unit 142, and a third result obtaining unit 143, as shown in FIG. 13.

The first result obtaining unit 141 is configured to determine the voiceprint feature information as the object recognition information in a case that the voice confidence value is greater than or equal to a first confidence threshold, and obtain the object recognition result of the target object according to the object recognition information.

In an embodiment, when the voice confidence value is greater than or equal to the first confidence threshold, it may represent that the credibility of the identity information of the target object confirmed according to the voiceprint feature information is relatively large, the first result obtaining unit 141 may determine the voiceprint feature information as the object recognition information, and then recognize the identity information of the target object by using the voiceprint feature information. In this case, the position information is not involved in the identity confirmation but is only used for locating a sound source.

In an embodiment, the first confidence threshold may be set to 90%, 95%, or another value determined according to an actual situation.

The second result obtaining unit 142 is configured to determine the position information and the voiceprint feature information as the object recognition information in a case that the voice confidence value is greater than or equal to a second confidence threshold and is less than the first confidence threshold, and obtain the object recognition result of the target object according to the object recognition information.

In an embodiment, when the voice confidence value is greater than or equal to the second confidence threshold and is less than the first confidence threshold, it may represent that the credibility of the identity information of the target object confirmed according to the voiceprint feature information is at an average level. To recognize the identity of the target object more accurately, The second result obtaining unit 142 may determine the position information and the voiceprint feature information both as the object recognition information, then perform voiceprint recognition by using the voiceprint feature information to initially determine the identity of the target object, and further recognize the identity of the target object by using a sound source direction located by using the position information.

In an embodiment, the first confidence threshold may be set to 90%, 95% or another value determined according to an actual situation, and the second confidence threshold may be set to 50%, 55%, 60% or other data that may represent an average value and that is determined according to an actual situation.

The third result obtaining unit 143 is configured to determine the position information as the object recognition information in a case that the voice confidence value is less than the second confidence threshold, and obtain the object recognition result of the target object according to the object recognition information.

In an embodiment, in a case that the voice confidence value is less than the second confidence threshold, it may represent that the credibility of the identity information of the target object confirmed according to the voiceprint feature information is relatively low, and the accuracy of the identity of the target object recognized by using the voiceprint feature information is relatively low. The third result obtaining subunit 1323 may determine the position information as the object recognition information, and then determine the identity of the target object by using a location direction located by using position information of the sound source, to implement voice separation in the same speech environment. It may be understood that, when the position information is used as the object recognition information, an error in an allowed range may exist in the recognition process. In this case, the current speech environment needs a specific speech environment, for example, an environment in which the position of the target object is determined (for example, positions of the judge and the prisoner are determined in a court trial).

In this embodiment of this application, the object recognition information used for object recognition is determined by using the voice confidence value, thereby avoiding a recognition process for unnecessary information in the object recognition process, and improving object recognition efficiency.

In a specific implementation of this embodiment of this application, the result obtaining module 14 may include an information determining subunit 1421, a candidate result obtaining subunit 1422, and a result obtaining subunit 1423, as shown in FIG. 14.

The information determining subunit 1421 is configured to determine the position information and the voiceprint feature information both as the object recognition information in a case that the voice confidence value is greater than or equal to a second confidence threshold and is less than the first confidence threshold.

In specific implementation, for the detailed process of the information determining subunit 1421 determining the object recognition information, reference may be made to the description in the foregoing method embodiments. Details are not described herein again.

The candidate result obtaining subunit 1422 is configured to obtain candidate recognition results of the target object according to the voiceprint feature information.

In specific implementation, after the information determining subunit 1421 determines the position information and the voiceprint feature information both as the object recognition information, the candidate result obtaining subunit 1422 may obtain the candidate recognition results of the target object according to the voiceprint feature information. It may be understood that, when the voiceprint feature information of the target object is obviously different, the candidate recognition results may be final object recognition results of the target object, that is, the object recognition device may clearly recognize the speech information of the target object from a plurality of pieces of speech information. When at least two target objects with non-obviously different voiceprint feature information exist in the target objects, the correspondence between the target object indicated by the candidate recognition result and the speech information may be inaccurate. For example, if the voiceprint feature information of judge A and prisoner B is very similar, the object recognition device may mistake the speech information of prisoner B for the speech information of judge A or mistake the speech information of judge A for the speech information of prisoner B when recognizing the speech information of judge A from the plurality of pieces of speech information in the court trial.

The result obtaining subunit 1423 is configured to locate the object recognition result of the target object from the candidate recognition results by using the position information.

In an embodiment, while the candidate result obtaining subunit 1422 initially recognizes the candidate recognition results of the target object according to the voiceprint feature information, the result obtaining subunit 1423 may further locate the object recognition result of the target object from the candidate recognition results by using a sound source direction located according to the position information, that is, the result obtaining subunit 1423 may adjust the candidate recognition results and finally determine the object recognition result of the target object. For example, voiceprint feature information of judge A and prisoner B is very similar, the candidate recognition result indicates that speech information of judge A corresponds to prisoner B, and the object recognition device may correspond speech information of judge A to judge A with reference to position information of judge A.

In this embodiment of this application, the object recognition results of the target objects are recognized simultaneously by using the position information and the voiceprint feature information, thereby further increasing the accuracy of the obtained object recognition result.

In this embodiment of this application, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result; the object recognition information used for object recognition is determined by using the voice confidence value, thereby avoiding a recognition process for unnecessary information in the object recognition process, and improving object recognition efficiency; and the object recognition results of the target objects are recognized simultaneously by using the position information and the voiceprint feature information, thereby further increasing the accuracy of the obtained object recognition result.

In an embodiment, a computer device is provided, including a memory and a processor, the memory stores a computer-readable instruction, and when executed by the processor, the computer-readable instruction causes the processor to perform the following steps: obtaining speech information of a target object in a current speech environment and position information of the target object; performing voiceprint feature extraction on the speech information based on a trained voiceprint matching model, to obtain voiceprint feature information corresponding to the speech information after the voiceprint feature extraction; obtaining a voice confidence value corresponding to the voiceprint feature information; and obtaining an object recognition result of the target object based on the voice confidence value and by using the position information and the voiceprint feature information.

In an embodiment, when executed by the processor, the computer-readable instruction causes the processor to perform the following steps when performing the step of obtaining speech information of a target object in a current speech environment and position information of the target object: obtaining a speech information set in the current speech environment based on a microphone array; performing screening processing on the speech information set, to obtain the speech information of the target object after the screening processing; obtaining phase information of the microphone array during acquiring of the speech information set; and determining the position information of the target object based on a speech position indicated by the phase information.

In an embodiment, when executed by the processor, the computer-readable instruction causes the processor to further perform the following steps before performing the step of obtaining speech information of a target object in a current speech environment and position information of the target object: obtaining a voiceprint training speech set; and training an established voiceprint matching model based on voiceprint training speeches in the voiceprint training speech set and sample feature information corresponding to the voiceprint training speeches, to generate the trained voiceprint matching model.

In an embodiment, when executed by the processor, the computer-readable instruction causes the processor to perform the following steps when performing the step of obtaining a voice confidence value corresponding to the voiceprint feature information: matching the voiceprint feature information with the sample feature information corresponding to the voiceprint training speeches, to obtain a matching degree value of a highest feature matching degree; and determining the voice confidence value corresponding to the voiceprint feature information according to the matching degree value.

In an embodiment, when executed by the processor, the computer-readable instruction causes the processor to perform the following steps when performing the step of obtaining an object recognition result of the target object based on the voice confidence value and by using the position information and the voiceprint feature information: determining object recognition information in the position information and the voiceprint feature information based on a relationship between the voice confidence value and a preset voice confidence value threshold; and obtaining the object recognition result of the target object according to the object recognition information.

In an embodiment, when executed by the processor, the computer-readable instruction causes the processor to perform the following steps when performing the step of determining object recognition information in the position information and the voiceprint feature information based on a relationship between the voice confidence value and a preset voice confidence value threshold: determining the voiceprint feature information as the object recognition information in a case that the voice confidence value is greater than or equal to a first confidence threshold; determining the position information and the voiceprint feature information both as the object recognition information in a case that the voice confidence value is greater than or equal to a second confidence threshold and is less than the first confidence threshold; and determining the position information as the object recognition information in a case that the voice confidence value is less than the second confidence threshold.

In an embodiment, the position information and the voiceprint feature information are determined as the object recognition information in a case that the voice confidence value is greater than or equal to the second confidence threshold and is less than the first confidence threshold, and when executed by the processor, the computer-readable instruction causes the processor to perform the following operations when performing the operation of obtaining the object recognition result of the target object according to the object recognition information: obtaining candidate recognition results of the target object according to the voiceprint feature information; and locating the object recognition result of the target object from the candidate recognition results by using the position information.

In the foregoing computer device, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result.

A non-volatile computer-readable storage medium storing a computer-readable instruction is provided, and when executed by one or more processors, the computer-readable instruction causes the one or more processors to perform the following steps: obtaining speech information of a target object in a current speech environment and position information of the target object; performing voiceprint feature extraction on the speech information based on a trained voiceprint matching model, to obtain voiceprint feature information corresponding to the speech information after the voiceprint feature extraction; obtaining a voice confidence value corresponding to the voiceprint feature information; and obtaining an object recognition result of the target object based on the voice confidence value and by using the position information and the voiceprint feature information.

In an embodiment, when executed by the processor, the computer-readable instruction causes the processor to perform the following steps when performing the step of obtaining speech information of a target object in a current speech environment and position information of the target object: obtaining a speech information set in the current speech environment based on a microphone array; performing screening processing on the speech information set, to obtain the speech information of the target object after the screening processing; obtaining phase information of the microphone array during acquiring of the speech information set; and determining the position information of the target object based on a speech position indicated by the phase information.

In an embodiment, when executed by the processor, the computer-readable instruction causes the processor to further perform the following steps before performing the step of obtaining speech information of a target object in a current speech environment and position information of the target object: obtaining a voiceprint training speech set; and training an established voiceprint matching model based on voiceprint training speeches in the voiceprint training speech set and sample feature information corresponding to the voiceprint training speeches, to generate the trained voiceprint matching model.

In an embodiment, when executed by the processor, the computer-readable instruction causes the processor to perform the following steps when performing the step of obtaining a voice confidence value corresponding to the voiceprint feature information: matching the voiceprint feature information with the sample feature information corresponding to the voiceprint training speeches, to obtain a matching degree value of a highest feature matching degree; and determining the voice confidence value corresponding to the voiceprint feature information according to the matching degree value.

In an embodiment, when executed by the processor, the computer-readable instruction causes the processor to perform the following steps when performing the step of obtaining an object recognition result of the target object based on the voice confidence value and by using the position information and the voiceprint feature information: determining object recognition information in the position information and the voiceprint feature information based on a relationship between the voice confidence value and a preset voice confidence value threshold; and obtaining the object recognition result of the target object according to the object recognition information.

In an embodiment, when executed by the processor, the computer-readable instruction causes the processor to perform the following steps when performing the step of determining object recognition information in the position information and the voiceprint feature information based on a relationship between the voice confidence value and a preset voice confidence value threshold: determining the voiceprint feature information as the object recognition information in a case that the voice confidence value is greater than or equal to a first confidence threshold; determining the position information and the voiceprint feature information both as the object recognition information when the voice confidence value is greater than or equal to a second confidence threshold and is less than the first confidence threshold; and determining the position information as the object recognition information in a case that the voice confidence value is less than the second confidence threshold.

In an embodiment, the position information and the voiceprint feature information are determined as the object recognition information when the voice confidence value is greater than or equal to the second confidence threshold and is less than the first confidence threshold, and when executed by the processor, the computer-readable instruction causes the processor to perform the following operations when performing the operation of obtaining the object recognition result of the target object according to the object recognition information: obtaining candidate recognition results of the target object according to the voiceprint feature information; and locating the object recognition result of the target object from the candidate recognition results by using the position information.

In the foregoing computer-readable storage medium, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result.

Figure 15:
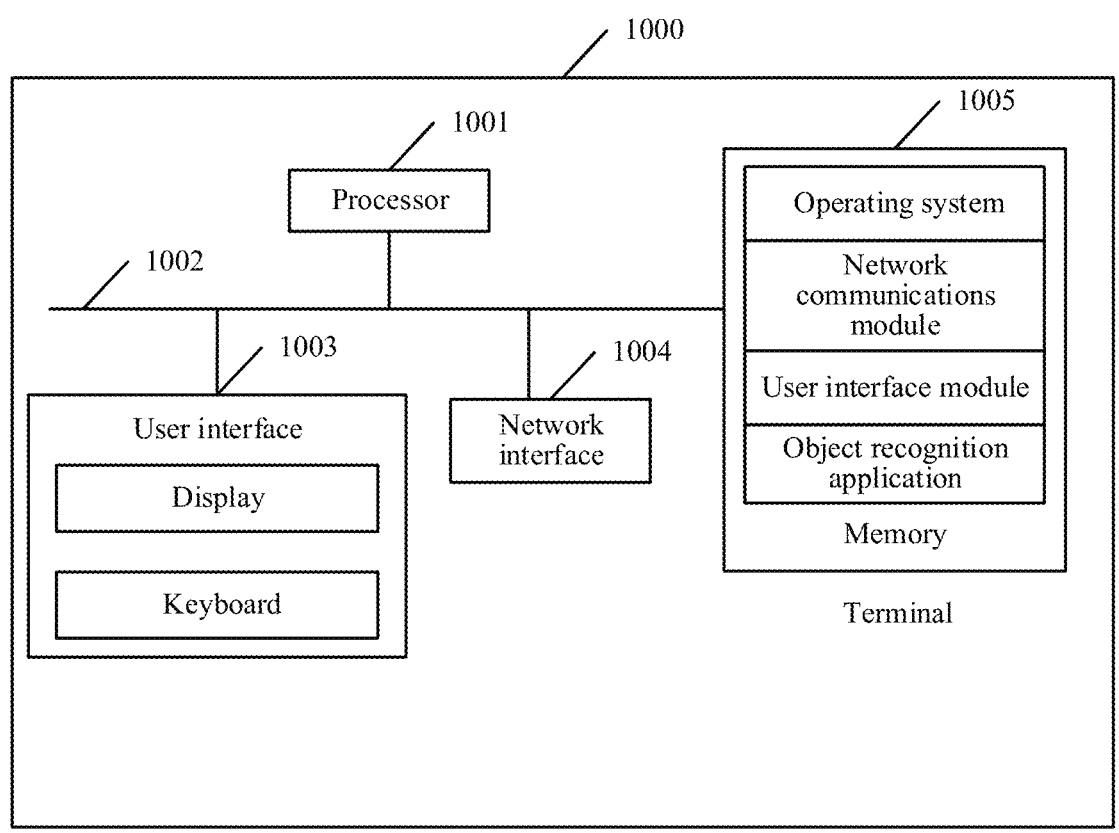
FIG. 15 is a schematic structural diagram of a terminal according to an embodiment of this application.

FIG. 15 is a schematic structural diagram of a terminal according to an embodiment of this application. As shown in FIG. 15, the terminal 1000 may include at least one processor 1001 such as a CPU, at least one network interface 1004, a user interface 1003, a memory 1005, and at least one communications bus 1002. The communications bus 1002 is configured to implement connection and communication between the components. The user interface 1003 may include a display, a keyboard, and optionally, the user interface 1003 may further include a standard wired interface and a standard wireless interface. Optionally, the network interface 1004 may include a standard wired interface and a standard wireless interface (such as a WiFi interface). The memory 1005 may be a high-speed RAM memory, or may be a non-volatile memory, for example, at least one magnetic disk memory. Optionally, the memory 1005 may further be at least one storage apparatus that is located far away from the processor 1001. As shown in FIG. 15, the memory 1005, which is used as a computer storage medium, may include an operating system, a network communications module, a user interface module, and an object recognition application.

In the terminal 1000 shown in FIG. 15, the user interface 1003 is mainly configured to: provide an input interface for a user, and obtain data entered by the user. The network interface 1004 is configured to perform data communication with a user terminal. The processor 1001 may be configured to invoke the object recognition application stored in the memory 1005 and specifically perform the foregoing object recognition method.

In this embodiment of this application, speech information of a target object in a current speech environment and position information of the target object are obtained, then voiceprint feature extraction is performed on the speech information based on a trained voiceprint matching model, and voiceprint feature information corresponding to the speech information after the voiceprint feature extraction is obtained; and finally a voice confidence value corresponding to the voiceprint feature information is obtained, and an object recognition result of the target object is obtained based on the voice confidence value and by using the position information and the voiceprint feature information. In embodiments of the present disclosure, the object recognition result is obtained according to the voice confidence value, the position information, and/or the voiceprint feature information, thereby increasing accuracy of the obtained object recognition result; the object recognition information used for object recognition is determined by using the voice confidence value, thereby avoiding a recognition process for unnecessary information in the object recognition process, and improving object recognition efficiency; and the object recognition results of the target objects are recognized simultaneously by using the position information and the voiceprint feature information, thereby further increasing the accuracy of the obtained object recognition result.

A person of ordinary skill in the art may understand that all or some of the processes of the methods in the embodiments may be implemented by a computer program instructing relevant hardware. The program may be stored in a computer-readable storage medium. When the program is executed, the procedures of the methods in the embodiments are performed. The storage medium may be a magnetic disk, an optical disc, a read-only memory (ROM), or a random access memory (RAM).

What is disclosed above is merely an example of the embodiments of the present invention, and certainly is not intended to limit the protection scope of the present disclosure. Therefore, equivalent variations made in accordance with the claims of the present disclosure shall fall within the scope of the present disclosure.

What is claimed is:

1. An object recognition method performed by a computer, comprising:

obtaining speech information of a target object in a current speech environment and position information of the target object;

extracting voiceprint feature from the speech information based on a trained voiceprint matching model, to obtain voiceprint feature information;

obtaining a voice confidence value corresponding to the voiceprint feature information;

comparing the voice confidence value with a first confidence threshold and a second confidence threshold respectively;

identifying the voiceprint feature information as the object recognition information if the voice confidence value is greater than or equal to the first confidence threshold;

determining the position information and the voiceprint feature information both as the object recognition information if the voice confidence value is greater than or equal to the second confidence threshold and is less than the first confidence threshold;

determining the position information as the object recognition information if the voice confidence value is less than the second confidence threshold; and obtaining an object recognition result of the target object according to the object recognition information.

2. The method according to claim 1, wherein the obtaining speech information of a target object in a current speech environment and position information of the target object comprises:

obtaining a speech information set in the current speech environment based on a microphone array;

performing screening processing on the speech information set, to obtain the speech information of the target object after the screening processing;

obtaining phase information of the microphone array during acquiring of the speech information set; and determining the position information of the target object based on a speech position indicated by the phase information.

3. The method according to claim 1, wherein before the obtaining speech information of a target object in a current speech environment and position information of the target object, the method further comprises:

obtaining a voiceprint training speech set; and training a voiceprint matching model based on voiceprint training speeches in the voiceprint training speech set and sample feature information corresponding to the voiceprint training speeches, to generate the trained voiceprint matching model.

4. The method according to claim 3, wherein the obtaining a voice confidence value corresponding to the voiceprint feature information comprises:

matching the voiceprint feature information with the sample feature information corresponding to the voiceprint training speeches, to obtain a highest feature matching degree value; and determining the voice confidence value corresponding to the voiceprint feature information according to the matching degree value.

5. The method according to claim 1, wherein after determining the position information and the voiceprint feature information both as the object recognition information if the voice confidence value is greater than or equal to a second confidence threshold and is less than the first confidence threshold, the obtaining the object recognition result of the target object according to the object recognition information comprises:

obtaining candidate recognition results of the target object according to the voiceprint feature information; and
locating the object recognition result of the target object from the candidate recognition results according to the position information.

6. A computer device, comprising a processor and a memory, the memory storing a computer-readable instruction, and when executed by the processor, the computer-readable instruction causing the processor to perform operations including:
obtaining speech information of a target object in a current speech environment and position information of the target object;
extracting voiceprint feature from the speech information based on a trained voiceprint matching model, to obtain voiceprint feature information;
obtaining a voice confidence value corresponding to the voiceprint feature information;
comparing the voice confidence value with a first confidence threshold and a second confidence threshold respectively;
identifying the voiceprint feature information as the object recognition information if the voice confidence value is greater than or equal to the first confidence threshold;
determining the position information and the voiceprint feature information both as the object recognition information if the voice confidence value is greater than or equal to the second confidence threshold and is less than the first confidence threshold;
determining the position information as the object recognition information if the voice confidence value is less than the second confidence threshold; and
obtaining an object recognition result of the target object according to the object recognition information.

7. The computer device according to claim 6, wherein when executed by the processor, the computer-readable instruction causes the processor to perform:
obtaining a speech information set in the current speech environment based on a microphone array;
performing screening processing on the speech information set, to obtain the speech information of the target object after the screening processing;
obtaining phase information of the microphone array during acquiring of the speech information set; and
determining the position information of the target object based on a speech position indicated by the phase information.

8. The computer device according to claim 6, wherein when executed by the processor, the computer-readable instruction causes the processor to perform:
obtaining a voiceprint training speech set; and
training an established voiceprint matching model based on voiceprint training speeches in the voiceprint training speech set and sample feature information corresponding to the voiceprint training speeches, to generate the trained voiceprint matching model.

9. The computer device according to claim 8, wherein when executed by the processor, the computer-readable instruction causes the processor to perform:
matching the voiceprint feature information with the sample feature information corresponding to the voiceprint training speeches, to obtain a highest feature matching degree value; and
determining the voice confidence value corresponding to the voiceprint feature information according to the matching degree value.

10. The computer device according to claim 6, wherein when performing the operation of obtaining the object recognition result of the target object according to the object recognition information, the computer-readable instruction further causes the processor to perform:
obtaining candidate recognition results of the target object according to the voiceprint feature information; and
locating the object recognition result of the target object from the candidate recognition results according to the position information.

11. A non-transitory computer-readable storage medium, storing a computer-readable instruction, and when executed by one or more processors, the computer-readable instruction causing the one or more processors to perform:
obtaining speech information of a target object in a current speech environment and position information of the target object;
extracting voiceprint feature from the speech information based on a trained voiceprint matching model, to obtain voiceprint feature information;
obtaining a voice confidence value corresponding to the voiceprint feature information;
comparing the voice confidence value with a first confidence threshold and a second confidence threshold respectively;
identifying the voiceprint feature information as the object recognition information if the voice confidence value is greater than or equal to the first confidence threshold;
determining the position information and the voiceprint feature information both as the object recognition information if the voice confidence value is greater than or equal to the second confidence threshold and is less than the first confidence threshold;
determining the position information as the object recognition information if the voice confidence value is less than the second confidence threshold; and
obtaining an object recognition result of the target object according to the object recognition information.

12. The computer-readable storage medium according to claim 11, wherein when performing the operation of obtaining speech information of a target object in a current speech environment and position information of the target object, the computer-readable instruction further causes the processor to perform:
obtaining a speech information set in the current speech environment based on a microphone array;
performing screening processing on the speech information set, to obtain the speech information of the target object after the screening processing;
obtaining phase information of the microphone array during acquiring of the speech information set; and
determining the position information of the target object based on a speech position indicated by the phase information.

13. The computer-readable storage medium according to claim 11, wherein before performing the operation of obtaining speech information of a target object in a current speech environment and position information of the target object, the computer-readable instruction further causes the processor to perform:
obtaining a voiceprint training speech set; and
training a voiceprint matching model based on voiceprint training speeches in the voiceprint training speech set and sample feature information corresponding to the voiceprint training speeches, to generate the trained voiceprint matching model.

14. The computer-readable storage medium according to claim 13, wherein when performing the operation of obtaining a voice confidence value corresponding to the voiceprint feature information, the computer-readable instruction further causes the processor to perform:
- matching the voiceprint feature information with the sample feature information corresponding to the voiceprint training speeches, to obtain a highest feature matching degree value; and
- determining the voice confidence value corresponding to the voiceprint feature information according to the matching degree value.

* * * * *